Aug. 14, 1951     H. ALFVEN ET AL     2,563,807
ELECTRON DISCHARGE APPARATUS CIRCUIT
Original Filed March 4, 1946     17 Sheets-Sheet 1

INVENTORS
H. ALFVÉN
H. ROMANUS
BY *Leach and Rachine*
ATTORNEYS

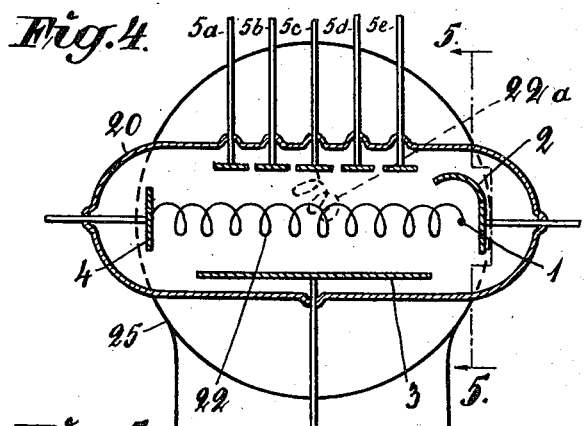
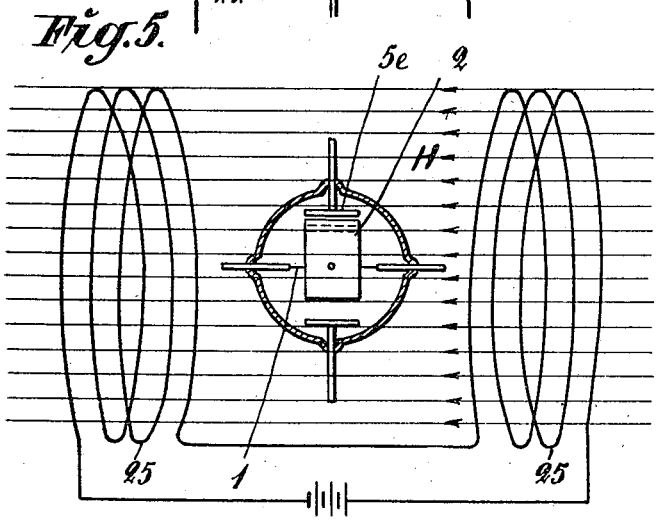
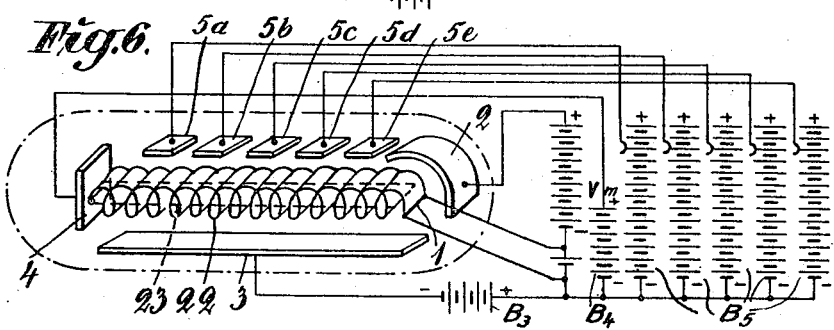

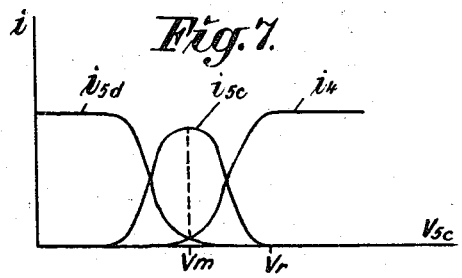
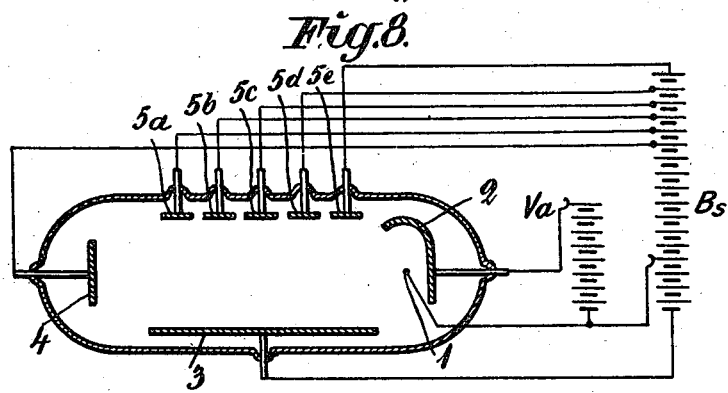
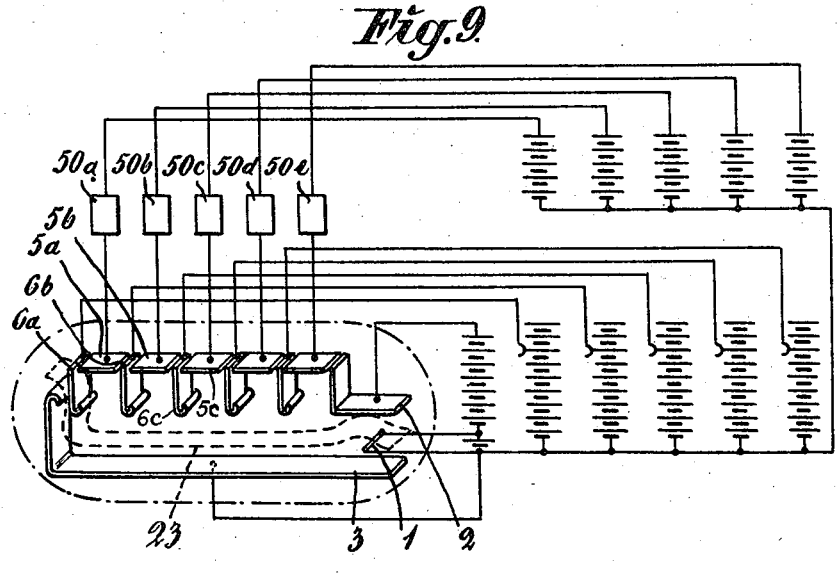

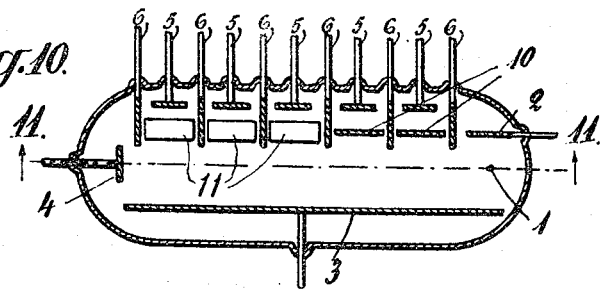
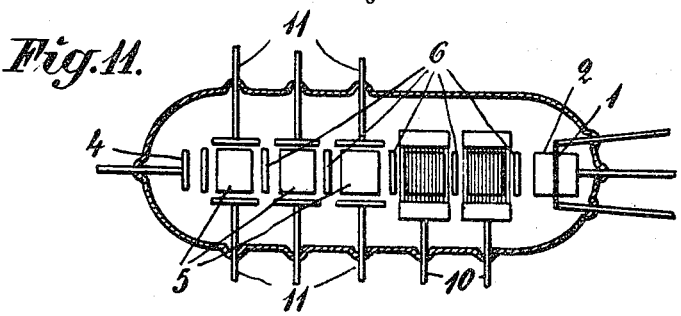
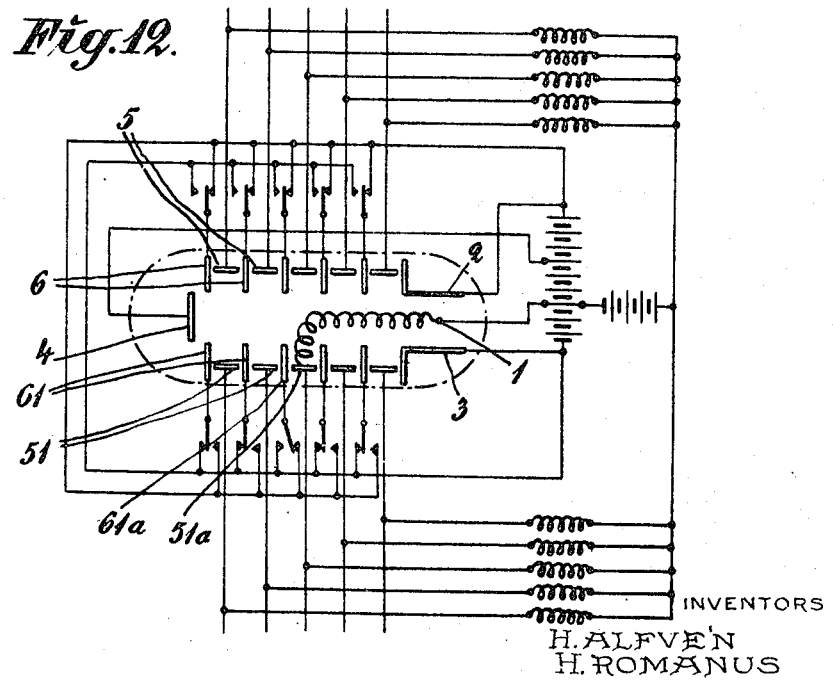

Aug. 14, 1951 H. ALFVEN ET AL 2,563,807
ELECTRON DISCHARGE APPARATUS CIRCUIT
Original Filed March 4, 1946 17 Sheets-Sheet 5
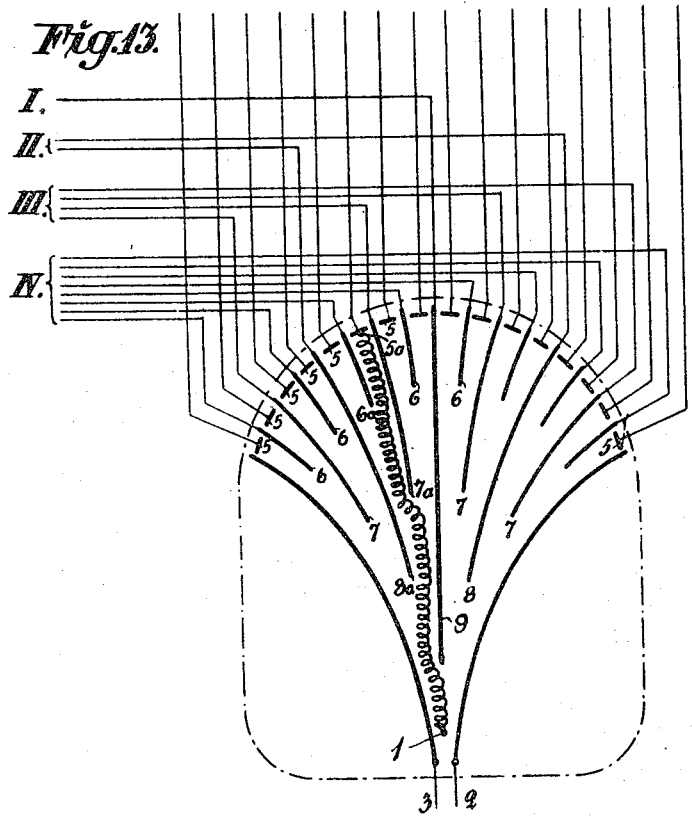
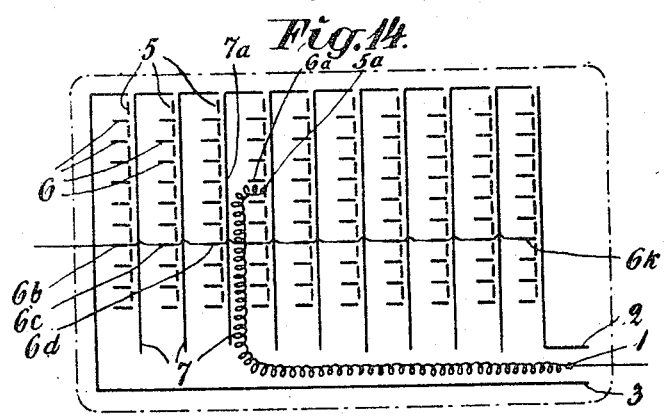
INVENTORS
H. ALFVEN
H. ROMANUS
BY Leech and Radue
ATTORNEYS Aug. 14, 1951     H. ALFVEN ET AL     2,563,807
ELECTRON DISCHARGE APPARATUS CIRCUIT
Original Filed March 4, 1946     17 Sheets-Sheet 6
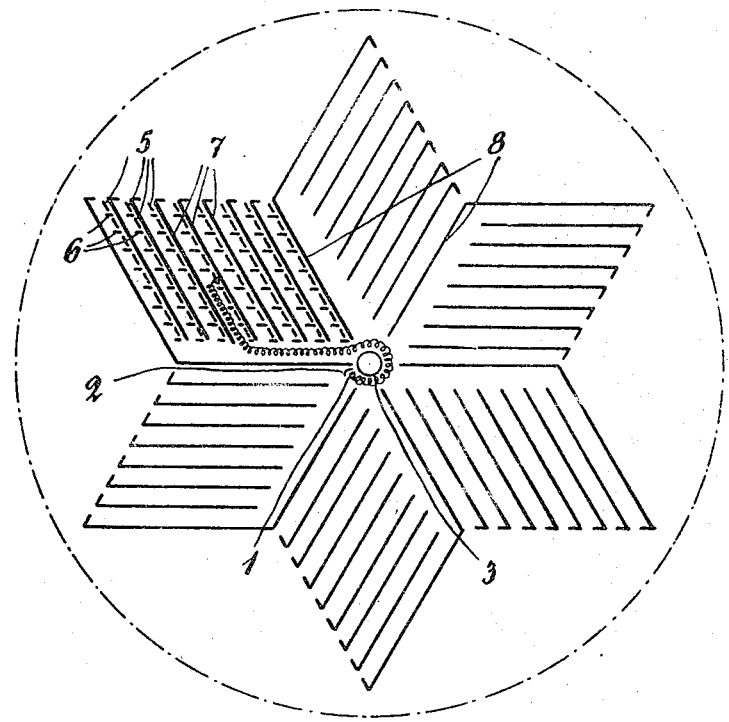
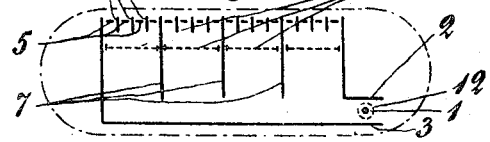
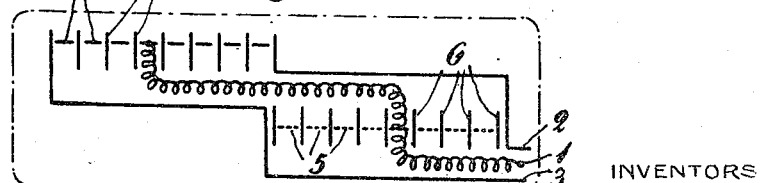
INVENTORS
H. ALFVÉN
H. ROMANUS
BY
ATTORNEYS

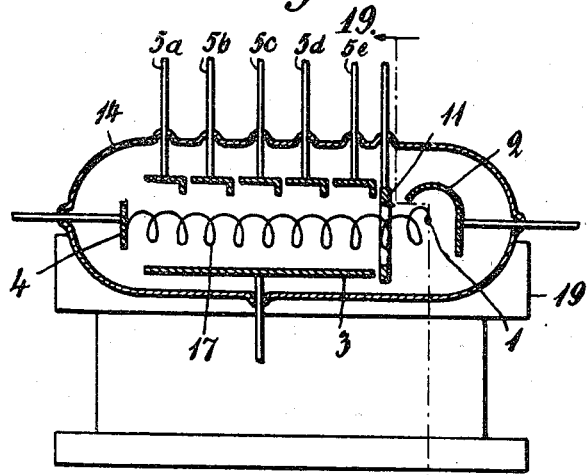
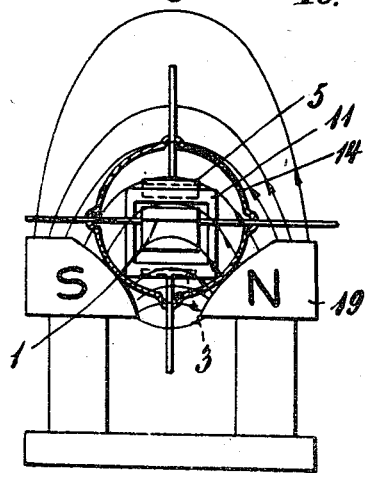

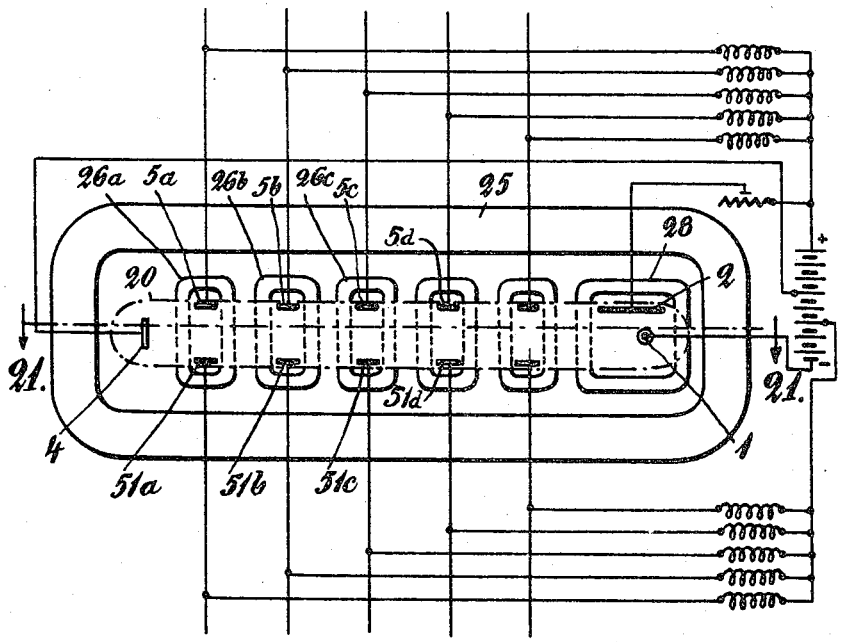
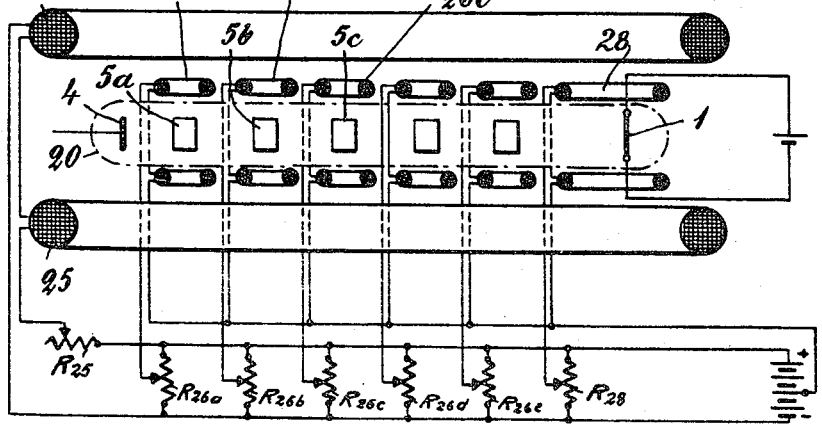

INVENTORS
H. ALFVÉN
H. ROMANUS

BY Leech and Rachue

ATTORNEYS

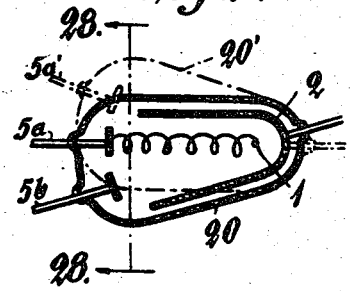
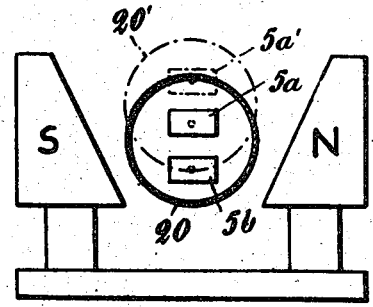
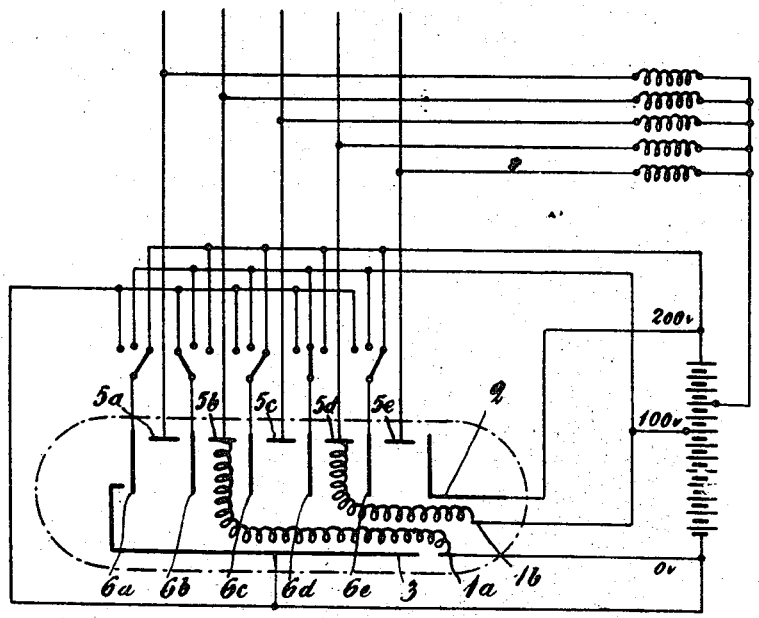

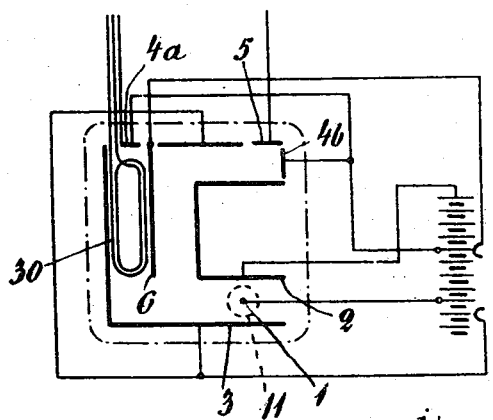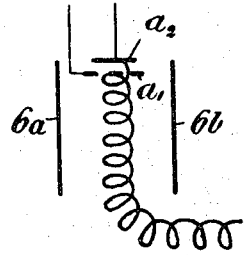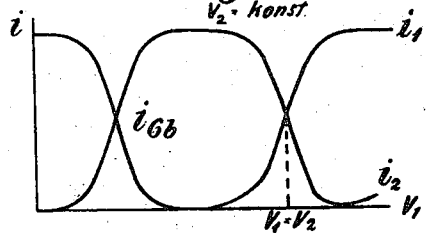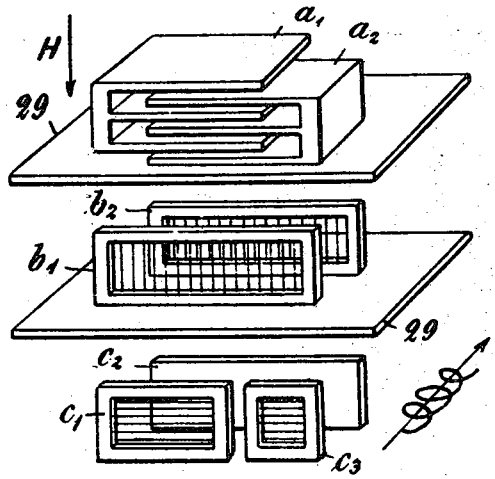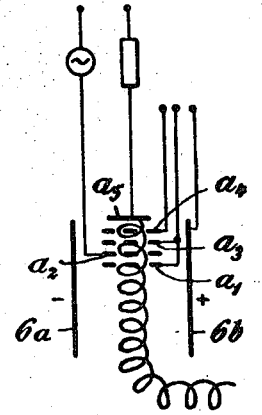

INVENTORS
H. ALFVÉN
H. ROMANUS

BY Leech and Radue

ATTORNEYS

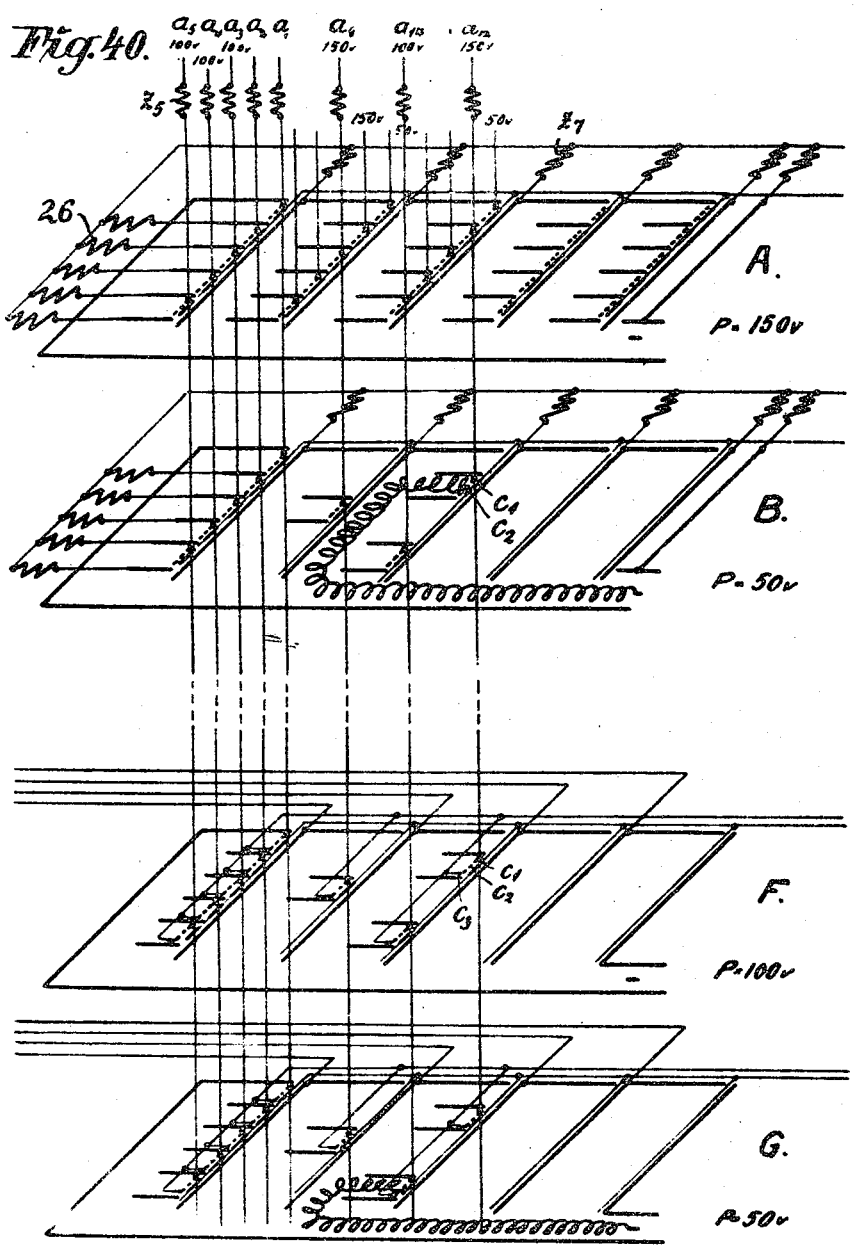

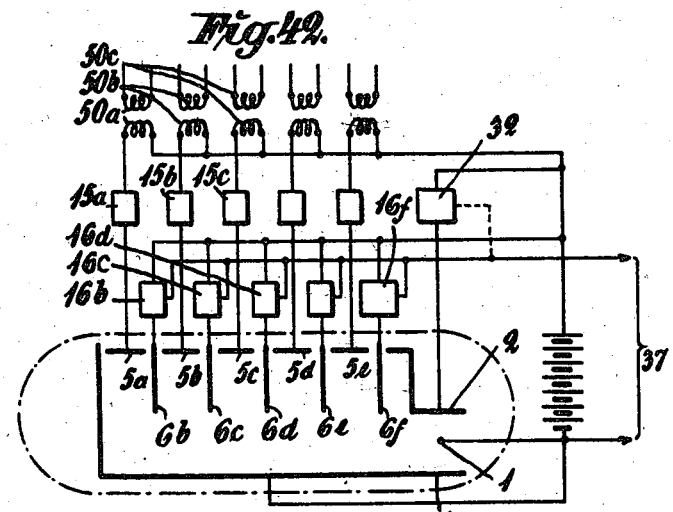
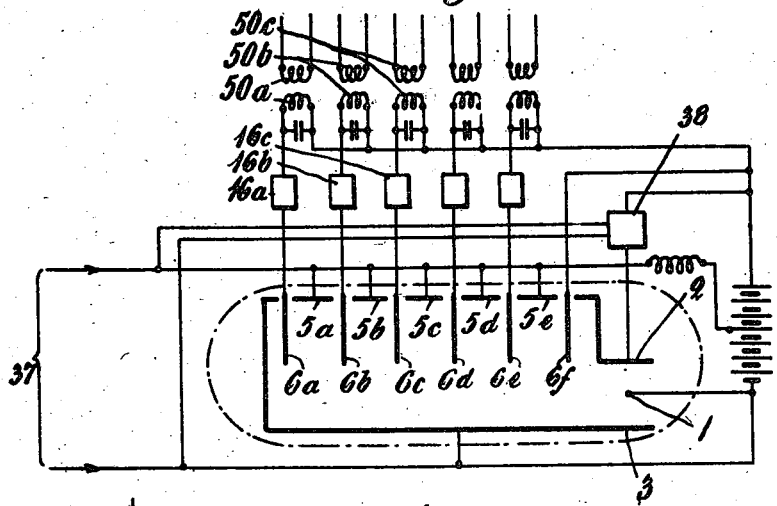
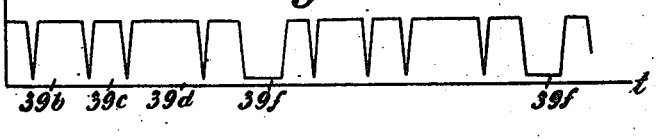

INVENTORS
H. ALFVÉN
H. ROMANUS

BY Leech and Rader

ATTORNEYS

Patented Aug. 14, 1951

2,563,807

UNITED STATES PATENT OFFICE 2,563,807

ELECTRON DISCHARGE APPARATUS CIRCUIT

Hannes Alfven and Harald Romanus, Stockholm, Sweden, assignors to Telefonaktiebolaget L M Ericsson, Stockholm, Sweden, a corporation of Sweden Original application March 4, 1946, Serial No. 651,920. Divided and this application October 13, 1949, Serial No. 121,152. In Sweden March 7, 1945

12 Claims. (Cl. 315—21)

The present invention relates to electron discharge apparatus and circuits therefor.

An object of the present invention is to produce electronic tubes which are adaptable to serve as selectors in automatic telephone systems. For this purpose it has been previously proposed to use cathode ray tubes of different designs in which the electron ray can be deviated so that it impinges on different electrodes in a switching field. A considerable inconvenience of such tubes is that they must be equipped with complicated devices to concentrate and focus the ray and that, in spite of high voltages used, this ray has an amperage which is unsatisfactory in view of the requirements in the art of telephony. Further the cathode ray tube takes up a considerable space in proportion to the surface of the switching field. In a tube according to the present invention there is no electron gun nor any electro-optical means necessary to generate the electron current causing the switching. The tube according to the present invention can be operated at lower voltages than a cathode ray tube but carries, in spite thereof, an amperage which is many times greater. Further it requires only a fraction of the space required by the cathode ray tube. The most important difference between the cathode ray tube and the present invention resides in the fact that in the electron ray of the former the electrons describe rectilinear or slightly circular or parabolic paths at a high velocity, whereas according to the present invention the electrons in the electron current perform a trochoidal or helical movement. It has been proved that such an electron current is more flexible and may be given more intricate geometrical configurations than is possible with a cathode ray and may therefore be formed in a manner impossible in cathode ray tubes.

Another embodiment of the invention is intended to be used as a switch or distributor, for instance, in simultaneous transmission of a number of telephone speeches or signal communications via a transmission line or a radio connection, said switch or distributor then associating the different telephone channels successively and cyclically to a common line. As such cyclic switches there have been used, inter alia, electrical discharge devices in which a rotating homogeneous magnetic field generates an electro-optical image of the cathode which image is successively impinged on the different anodes. The electrons move then in helical paths having axes parallel with the magnetic lines of force and the progressive direction of the electron current agrees always with the direction of the magnetic field. The utility of this known device is limited, inter alia, by the losses in the magnetic field coils, which losses increase with an increasing rotary frequency. According to the present invention there is used a magnetic field which may be stationary in space and an electric discharge tube in which the path of the progressive movement of the electron current is displaced in a direction differing from that of the magnetic field. This displacement may be effected by a change of the voltage of electrodes whereby a very high switching frequency is obtainable.

It is a characteristic feature of the invention that the electron current not only is shiftable in its entirety between different electrodes but that, as an alternative, its relative distribution on the electrodes may be gradually varied by the actuation of suitable control means. The present invention may therefore be used to transmit or amplify varying current processes or to modulate or generate electric oscillations. In a tube according to the invention the electrodes have further the property that within certain voltage ranges, the electron current of an electrode rises when the voltage thereof is reduced. Also this property may be used for the purpose of generating oscillations.

Other embodiments of the invention are intended to be used as oscillograph tubes or the like in which a varying electric process is made visible on a screen or photographic plate.

The invention is based on the utilization of an electron current in which the electrons perform a circular movement in a plane perpendicular to the magnetic field simultaneously with a progressive movement. This composite electron movement may be explained in principle as follows:

An electron starting at a certain initial velocity in a homogeneous magnetic field without being actuated by other forces moves in a path the projection of which is circular in a plane perpendicular to the magnetic field. If the starting velocity has a component parallel with the magnetic field or if an electric field parallel with the magnetic field is present the center of the circular path is displaced at the speed of said component in parallel with the magnetic field so that a helical path is described.

This electron movement may now be influenced by a disturbing force forming an angle to the magnetic field and being caused by an electric field or by an inhomogeneity in the magnetic field, or by a combination of said two factors.

The component of the disturbing force in the plane perpendicular to the magnetic field results in that the center of the circular movement is displaced in a direction which is substantially perpendicular both to the disturbing component and to the magnetic field. The velocity of the displacement is proportional to the intensity of the disturbing component. The projection of the electron path in the plane perpendicular to the magnetic field will then be trochoidal. The base line followed by the center of the circular movement during its progressive movement is in each point of the line determined by the intensity and direction of the disturbing force, i. e. the structure of the electric and magnetic fields. Hereby it is rendered possible to change the form of the base line in a variety of different manners so that the path of the electron current may be given practically any arbitrary course.

The above described electron movement may be produced in a vessel evacuated to a suitable low pressure in which vessel a certain velocity is imparted to the electrons emanating from an electron-emitting device (the electron source) and in which the electrons are subjected to a magnetic field. Through the action of the magnetic field the electron paths are curved so that the electrons are forced together within a region adjacent the electron source. Through the action of an electric field or inhomogenieties in the magnetic field as well as due to any initial velocity in the direction of the magnetic field which the electron source may have imparted to the electrons the electron paths are so displaced that said region is extended to form an electron channel projecting from the electron source. The width of this channel is dependent on the diameter of the circular paths of the electrons. The electrons are retained within the channel by the magnetic field.

The path of the electron channel through the tube is determined by the intensity and direction of the magnetic and electric fields in different points and the conditions on which the electron current leaves the electron source. The present invention relates to means adapted to change the course of the electron channel, said change being utilized for changing the distribution of the electron current on electrodes, or for producing electro-static, electro-magnetic or luminous effects.

The invention consists substantially therein that the position of the electron channel is controlled by one or more control devices (the electron control means) adapted to influence one or more of the above mentioned disturbing factors, or the properties of the electron current when leaving the electron source or the magnetic field.

In its most simple embodiment the electron tube has only one electrode device, the electron channel being then displaceable through the electron control means so that the electrode device is energized or deenergized. If the tube has at least two electrode devices the electron channel is so influenced according to the invention that switching takes place between two electrode devices or the distribution of the electron current on the two electrode devices is altered. Each electrode device may then comprise one, two or more electrodes as will be more closely described in the following text. An electrode device may in certain cases be equivalent with an electric charge of, for instance, a wall of the electron tube.

The invention will now be more closely described with reference to the accompanying drawings on which Fig. 1 illustrates the principle for establishing a trochoidal movement;

Fig. 2 is a diagrammatic illustration of the electron movement as utilized in the present invention;

Fig. 3 is a diagrammatic illustration of different methods to change the course of the electron current in an electron tube according to the invention;

Figure 22:
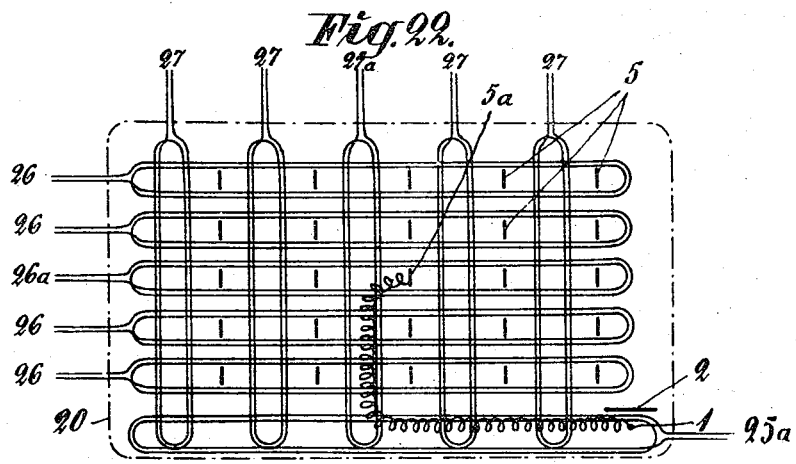
Figure 23:
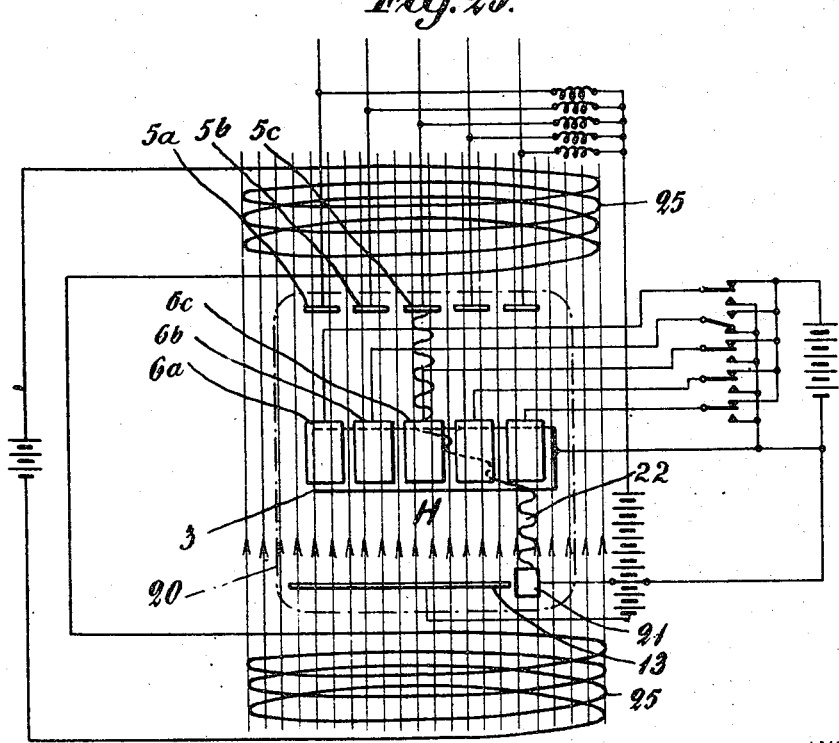
Figure 24:
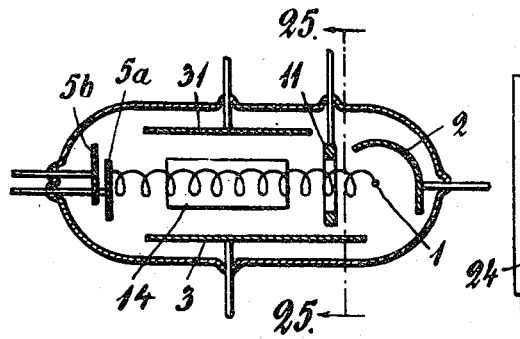
Figure 25:
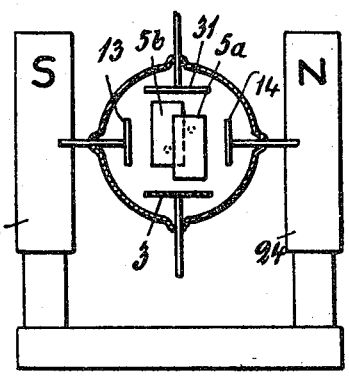
Figure 26:
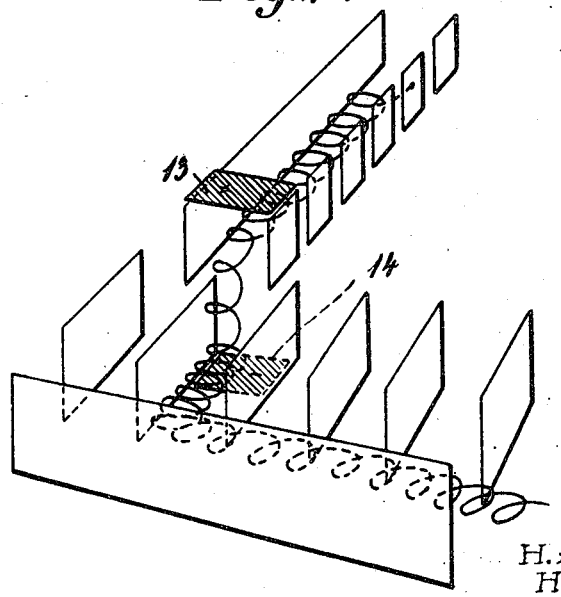
Figure 35:
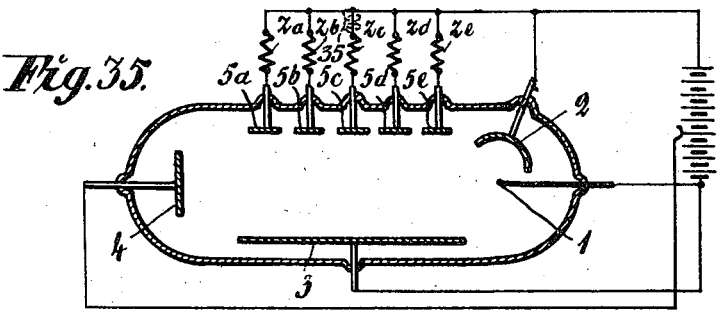
Figure 36:
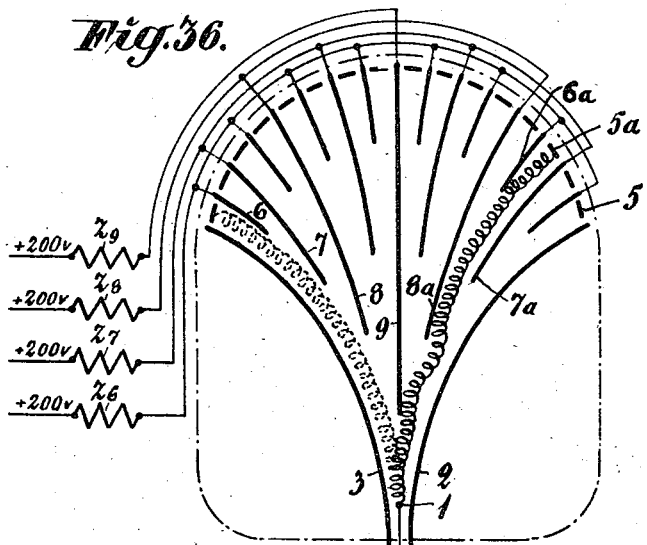
Figure 37:
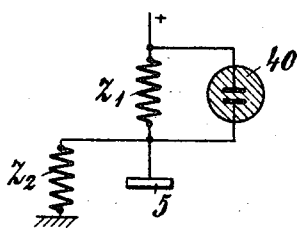
Figure 38:
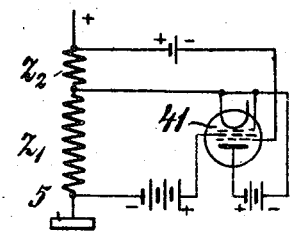
Figure 39:
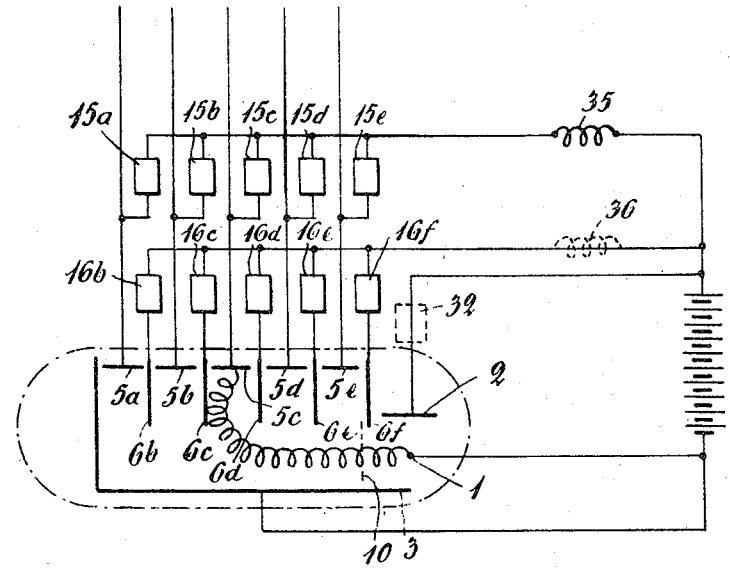
Figure 41:
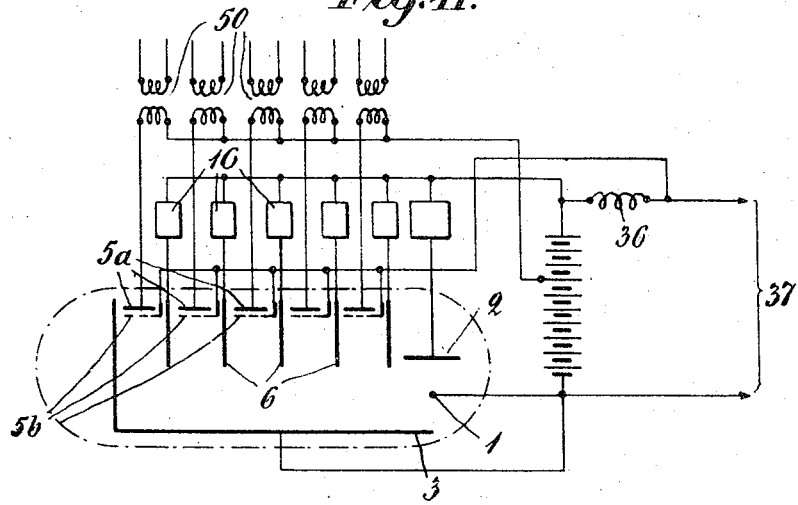
Figure 45:
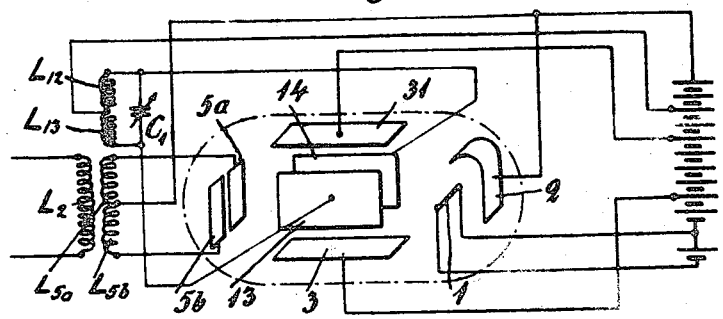
Figure 46:
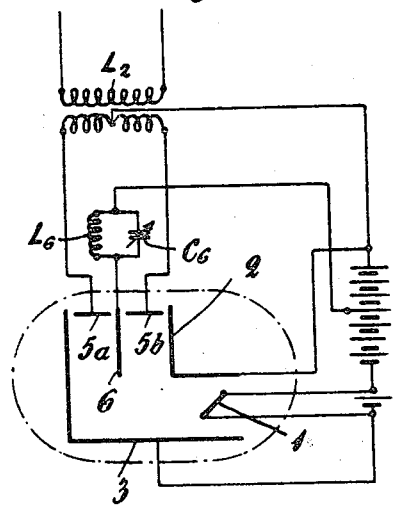
Figure 47:
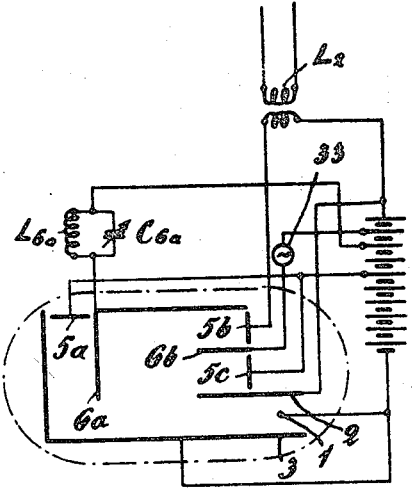
Figure 48:
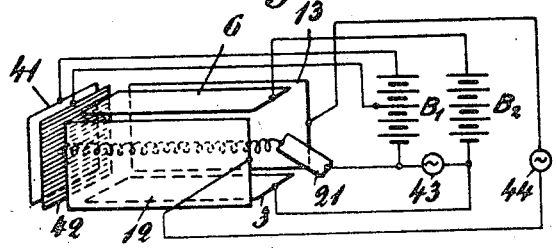

Figs. 4 and 5 are longitudinal and cross-sections on lines 4—4 and 5—5 respectively of an embodiment of an electron tube comprised by the invention;

Fig. 6 is a perspective view with a circuit diagram relating to a tube according to Figs. 4 and 5;

Fig. 7 is a current diagram relating to the shifting of the electron current and its distribution between different electrodes;

Fig. 8 is a circuit diagram relating to another method to shift the current of the tube shown in Figs. 4 and 5;

Fig. 9 is a circuit diagram and a perspective view relating to the utilization of two types of electrodes according to the invention, termed contact electrodes and control electrodes respectively;

Figs. 10 and 11 are a longitudinal section and a horizontal section on line 11—11 respectively of an electron tube including a further type of electrodes termed regulating electrodes;

Fig. 12 is a circuit diagram relating to an embodiment of the invention including control electrodes;

Figs. 13, 14, 15, 16 and 17 show diagrammatically different embodiments of the electron tube comprised by the invention;

Figs. 18 and 19 show a longitudinal section and a cross section on line 19—19 respectively of an embodiment of the invention including an inhomogeneous magnetic field;

Figs. 20 and 21 are a diagrammatic side view and a horizontal section on line 21—21 respectively of an embodiment of the invention including local control coils;

Fig. 22 shows diagrammatically an embodiment of the invention including different series of control coils;

Fig. 23 is a diagram for embodiments of the invention in which a movement of the electron also in the direction of the magnetic field is utilized;

Figs. 24 and 25 show longitudinal and cross sections respectively of an embodiment of the invention in which the electron current may be deviated in the direction of the magnetic field;

Fig. 26 is a perspective view of a part of an electrode system in which the electron current may be displaced also in the direction of the magnetic field;

Figs. 27 and 28 show a longitudinal section and a cross section on line 28—28 respectively of an embodiment of the invention adapted for mechanical shifting;

Fig. 29 is a circuit diagram for the manipulation of two electron currents within the same electrode system;

Fig. 30 is a diagrammatic illustration of devices for recording changes in the course and amperage of the electron current by inductive or capacitive means;

Fig. 31 is a diagrammatic illustration of a contact couple;

Fig. 32 is a current diagram relating to a contact couple;

Fig. 33 shows different embodiments of contact couples;

Fig. 34 is a diagrammatic illustration of a contact set including five electrodes;

Fig. 35 is a circuit diagram for the shifting of the electron current by means of an impulse of short duration;

Fig. 36 is a diagram illustrating the holding of the electron current by means of connection sets;

Figs. 37 and 38 are diagrams relating to connection sets including glow discharge lamps or electron tubes;

Fig. 39 is a circuit diagram showing shifting by means of impulsing;

Fig. 40 is a circuit diagram illustrating a method according to the invention for call and busy-marking in electron tubes used as finders and selectors in automatic telephone systems;

Fig. 41 shows diagrammatically the utilization of the invention as a cyclically operating switch in systems of multiple telephony;

Figs. 42 and 43 are diagrams illustrating the utilization of the invention in senders and receivers respectively in a system of multiple telephony having pulse-time-modulation;

Fig. 44 is a voltage diagram showing the wave shape of the impulses in the arrangement shown in Figs. 42 and 43;

Figs. 45 and 46 are circuit diagrams exemplifying the utilization of the invention in oscillators;

Fig. 47 is a diagram exemplifying the utilization of the invention in mixer tubes; and Fig. 48 illustrates diagrammatically an embodiment of the invention in which the electron current is made visible by energizing a fluorescent screen.

In the following specification the same reference characters refer to similar parts.

To illustrate the properties of the electron current according to the present invention a brief summary of the mathematical grounds for the electron movement will be presented. The electrons move in a magnetic field of the strength H under the influence of an electric field of the intensity E and/or inhomogeneities in the magnetic field. The electron movement is composed by a circular movement and a progressive movement of the center of the circle. Provided the effect of the inhomogeneities in the electric and magnetic fields are small in comparison with the force exerted on the electrons by the magnetic field the circular movement is characterized by the fact that the magnetic moment is constant. The circular movement takes place in a plane perpendicular to the magnetic field and is characterized by the equation $$r = c\sqrt{\frac{2m}{e}} \cdot \frac{\sqrt{v}}{H} \quad (1)$$

in which $r$ = the radius of the circle,
$v$ = the potential equivalent of the kinetic energy of an electron counted in a coordinate system moving at the velocity of the center of the circle which quantity may be termed "the reduced potential,"
$m$ = the mass of the electron,
$e$ = the charge of the electron,
$c$ = the velocity of light.

The movement of the center of the circle is determined by the equations $$U_x = \frac{c}{eH} \cdot f_y \quad (2)$$

$$U_y = \frac{-c}{eH} \cdot f_x \quad (3)$$

$$\frac{d}{dt} \cdot v_z = \frac{f_z}{m} \quad (4)$$

in which $x$, $y$ and $z$ are the coordinates of the center of the circle in a coordinate system, the axes of which are at right angles but may be curved, the $z$-axis coinciding with the direction of the magnetic field H, and $f_x$, $f_y$ and $f_z$ are the components of the disturbing force $f$ in the $x$-, $y$- and $z$-directions.

The disturbing force $f$ is obtained from the equation $$f = eE - \mu \, \text{grad} \, H - m\frac{dv_{xy}}{dt} \quad (5)$$

in which $\mu$ (mu) = the magnetic moment of the electron movement
$v_{xy}$ = the velocity of the center of the circle in the $xy$-plane The magnetic moment is $$\mu = \frac{eV}{H} = \text{constant} \quad (6)$$

From Equation 4 it may be seen that the movement of the electron in the $z$-direction is independent of its movement in the $xy$-plane. The electron movement in the direction of the magnetic field may thus be calculated separately and then directly superposed upon the movement in the plane perpendicular to the magnetic field. In the continuation of the mathematical considerations only the projection of the electron movement in the plane perpendicular to the magnetic field will be considered, compare Fig. 1.

It may then be proved that the projection of the center of the circular path in this plane is displaced along a line which may be called the base line and is characterized by the equation $$\frac{V}{H} = \frac{V' - \frac{mv^2}{2e}}{H} = C_1 \quad (7)$$

in which $V'$ = the electrostatic potential
$V$ = the above cited reduced potential
$C_1$ = a constant depending on the conditions on which the electron leaves the electron source.

In case of a homogeneous magnetic field, i. e. grad $H = 0$, and if the term $$m\frac{dv_{xy}}{dt}$$

is disregarded, the velocity $v$ of the displacement along the base line of the projection of the center of the circle will be $$v = \frac{c}{H} \cdot E \quad (8)$$

If also the electric field E is homogeneous the velocity of the center of the circle will thus be constant. The electron path will be trochoidal. The base line follows the curve $V = $ constant, i. e. an electric equipotential line. If the electric field obtains another strength the velocity $v$ is changed correspondingly, the trochoidal shape is changed and the base line is displaced to another equipotential line. For reasonable values of E the term $$\frac{mv^2}{2e}$$

in the Equation 7 may be disregarded in many cases and the base line will approximately follow the same equipotential line throughout the entire electric field.

The corresponding conditions occur in an inhomogeneous magnetic field if the intensity of the electric field is zero. The velocity of the center of the circle becomes proportional to grad $H$. As long as grad $H=$ a constant the base line will proceed through points having the same magnetic field intensity, i. e. it follows a curve in which $H=$ a constant, and the projection of the electron path will be trochoid. A change of grad $H$ causes a displacement of the base line to another $H$-value.

Also in the general case when both the electric and the magnetic field are inhomogeneous the projection of the electron path will be trochoidal. The form of the base line may in any particular case be calculated or tested-out empirically.

If the disturbing force exclusively consists of an electric field or of an inhomogeneity in the magnetic field the radius of the circular movement of the electron will be substantially constant. If both said disturbances occur at the same time the radius will, however, be changed.

The velocity of an electron in its circular movement is $$u = \sqrt{\frac{2eV}{m}} \quad (9)$$

The appearance of the trochoid may vary along the base line and is determined by the ratio between the circular velocity $u$ and the progressive velocity $v$. In Fig. 2 there are a few different trochoidal forms illustrated.

The position of the base line may, as is understood from the Equation 7, be influenced by changing the electric or the magnetic field or the constant $C_1$ or two or more of said factors at the same time. The value of the constant $C_1$ depends on the absolute value and direction of the velocity of the electron when it leaves the electron source and the intensity of the magnetic field in this point and may thus be varied by changing said factors.

Although the above summarized theory has been a guide in the inventors' conception of their invention it has been experimentally proved that often phenomena occur, inter alia, due to space charges, which result in deviations. The invention is, however, not restricted to the comparatively narrow range within which the theory is valid without modification.

It should be particularly noted that the above mentioned condition for the validity of the formulas, i. e. that the disturbing force should be small in relation to the force by which the magnetic field actuates the electron, need not, however, be complied with in all parts of the electron path. As a rule said condition is thus not valid in or adjacent the electron source. Deviations may also be of importance in other places, such as adjacent electrodes adapted to control the electron current or to receive this current.

Different embodiments of the invention will now be described.

Fig. 3 intends to illustrate diagrammatically different manners of influencing the position and form of the electron channel in such embodiments of the invention where the base line of the electron channel always falls in one and the same surface being perpendicular to the lines of force of the magnetic field. In the figure a closed vessel 20 is evacuated to a low pressure and includes an electron source 21 and a number of electrodes. The vessel is placed in a homogeneous magnetic field of the intensity $H$, the lines of force of which are perpendicular to the plane of the drawing paper. The voltage value indicated in each electrode of the drawing denotes the electrode potentials caused by exterior voltage sources and counted in relation to a cathode in the electron source 21. The electric field lines extending between electrodes of different potentials are assumed to run in parallel with the plane of the drawing paper. The electric field is thus at right angles to the magnetic field.

The electron source 21 includes, as above foreshadowed, an electron-emitting cathode and means for accelerating the electrons and, as an alternative, also means for regulating the amperage of the electron current. If the electrons leave the electron source at a velocity directed solely in the plane of the drawing paper, i. e. at right angles to the magnetic lines of force, the electrons will continue to move only in said plane. Under the action of the magnetic and electric fields they will describe trochoidal paths about the base line following curve $$\frac{V}{H} = \text{a constant}$$

in the plane. As the magnetic field is homogeneous this curve will substantially be an electric equipotential line termed in the following "the potential level of the electron current." The deviations which may occur between the base line and the equipotential line are in most cases of no practical importance. Should this, however, be the case they may easily be ascertained empirically and be considered in designing the electrodes. For the case of simplicity it is thus assumed in the following specification that the base line coincides with the equipotential line.

The potential level is determined by the velocity and direction of the electrons, when they leave the electron source, and by the intensity of the magnetic field immediately adjacent said electron source.

If the electron channel has a potential level of $+100$ v. and the electrodes have the potentials indicated in the figure the channel will follow the course indicated by the base line 23a. The electrodes 71 and 72 have a potential of $+100$ volts agreeing with the potential level of the channel and will entirely or partly fall within the channel. This is the case also as regards the electrodes 73, 74 and 75, although they carry potentials of $+110$ v., $+200$ v., and $+25$ v. respectively differing from the potential level of the electron channel, it being understood that the field distribution adjacent said electrodes is such that the equipotential line $+100$ v. is passing them at a distance which is less than half the width of the electron channel. This width is, as above stated, dependent on the diameter of the circular movement of the electrons and is substantially independent of the electric field as long as the magnetic field is constant.

Other electrodes, such as 76, the potentials of which agree with the potential level of the electron channel, are out of contact with the channel in spite of this fact, as the course of the channel in the corresponding direction is blocked by a potential barrier existing between the advanced electrodes 77 and 78.

If the potential of for instance the electrode 79 is changed from $+200$ volts to $\pm 0$ volts the field distribution will be changed so that the equipotential line $+100$ volts and thus also the electron channel from this place onwards, follows a new course 23b to the electrodes 80 and 81.

Without any mutual change of the potentials of the electrodes the electron channel may be caused to follow a new course by changing its potential level. If the potential level is raised to +200 volts the base line of the channel will follow the equipotential line 23c. The change of the potential level of the electron channel may be caused in the electron source by changing the potential of the cathode and/or of the acceleration means or by changing the potential of a grid and/or of control electrodes surrounding or being adjacent the cathode and/or finally changing the intensity of the magnetic field.

In the above stated methods to influence the position of the electron channel it has been presupposed that the magnetic field is homogeneous in all parts of the tube. The electron channel may, however, be displaced also by changing the intensity of the magnetic field within a local space. As $$\frac{V}{H} = \text{a constant}$$

an increase of the intensity of the magnetic field, by way of example, within a zone indicated by the line 45 will result in a displacement of the electron channel towards higher potential levels within said zone. The base line will now instead follow the line 23d and the electrode 82 will be hit by the electron current instead of the electrode 71.

The above cited principal examples illustrate that the electron current may be conducted to a desired electrode in several different manners. It can thus take place by imparting to the electrode a potential agreeing with the potential level of the electron channel, compare electrodes 71 and 72 in Fig. 3, or a potential being in the neighbourhood thereof, compare electrode 73. If the electric field is comparatively concentrated adjacent the electrode the latter can be energized even if its potential differs considerably from the potential level of the channel, compare electrodes 74 and 75. The course of the electron channel may also be changed by electrodes, which are not themselves hit by the electron current, compare electrode 79. New electron paths may further be established by imparting to the electron channel in or at the electron source another potential level, compare reference 23c, or by a local change in the intensity of the magnetic field, compare reference 45.

The electron current may during its course through the vessel make contact with several electrodes and be successively absorbed by them. The electron current may also at the end of its course hit several electrodes, such as 80 and 81, or groups of electrodes. If the current at any place along its course goes on both sides of the electrode, such as 71 in Fig. 3, or a shield, both parts of the electron current may be conducted in their continuations along separate sources and be brought into contact with different electrodes which may be widely separated in the space.

Figs. 4 to 6 and 8 to 17 show examples of embodiments of electron tubes according to the above stated principles. All of said tubes are assumed to be in a homogeneous magnetic field at right angles to the plane of the drawing paper.

The electron tube shown in Figs. 4 and 5 includes a cathode 1, an anode 2, an auxiliary electrode 3 (in certain cases exchangeable by the tube wall being charged with electricity and operating as an electrode), a zero electrode 4, and a number of electrodes 5a, 5b, 5c, et cetera, all included in a glass tube 20. This tube is placed in a homogeneous magnetic field H produced by two magnet coils 25.

Fig. 6 shows a way of connecting the valve shown in Figs. 4 and 5 into circuit. The electrons emitted by the hot cathode 1 are attracted by the anode 2 but are deflected by the magnetic field so that they describe circular paths. Between the auxiliary electrode 3, on the one hand, and the electrodes 5a, 5b, 5c et cetera, on the other, the batteries B3 and B5 maintain an electric field which is perpendicular to the magnetic field. Through the action of this electric field the centers of the circular paths will be displaced so that the electron paths become trochoidal. The displacement of the centers follows then substantially an electric equipotential surface 23, the potential of which in relation to the cathode is designated $V_m$. The electron current 22 thus flows forward in a channel between the auxiliary electrode 3, on the one hand, and the electrodes 5a, 5b, 5c et cetera, on the other, without coming into contact with any of them. The current will instead be absorbed by the zero electrode 4 which is connected to the voltage $V_m$.

The process in the shifting or redistribution of the electron current is diagrammatically illustrated in Fig. 7. The voltage of one of the electrodes 5, such as voltage $V_{5c}$ of electrode 5c, is lowered successively so that it approaches the potential level $V_m$ of the electron current. After the voltage has fallen below the value $V_r$ an increasing part $i_{5c}$ of the electron current will flow to this electrode 5c whereas the current $i_4$ to the electrode 4 is reduced. When the voltage $V_{5c}$ has sunk down to the value $V_m$ the entire electron current or the major portion thereof will pass to the electrode 5c. If the voltage $V_{5c}$ is further reduced the current $i_{5c}$ will be reduced but a part of the electron current now flows to the electrode 5d. At a sufficiently low voltage of the electrode 5c the amperage $i_{5c}$ thereof will again be zero and the current $i_{5d}$ to the electrode 54 reaches its maximum value. This depends on the fact that there is produced a potential barrier between the electrode 5c and the auxiliary electrode 3 which barrier forces the electron current onto the next electrode in front thereof. The change of the course of the electron current onto a certain electrode may thus take place in the shown circuit arrangement either by changing the voltage of this electrode to a value adjacent the potential level of the electron current or by changing the voltage of the next electrode in the path of the electron current to a value adjacent the voltage of the auxiliary electrode.

From Fig. 7 it may be seen that, as regards values of the voltage $V_{5c}$ falling between $V_r$ and $V_m$, the current $i_{5c}$ will increase if the voltage $V_{5c}$ is reduced. The electrode device thus has within this voltage range a dynatron characteristic, i. e. it represents a negative resistance.

It must be pointed out that the above theoretical interpretation is simplified. In reality electrons emitted under different conditions form a band with different values of $V_m$. Moreover the presence of space charge complicates the phenomena.

In the circuit diagram shown in Fig. 6 the electrodes 5a, 5b, 5c et cetera have been denoted to be positive and the auxiliary electrode 3 negative in relation to the potential level of the electron current. The arrangement may, however, be used also with reversed voltages on said electrodes, for instance by changing the polarities of the batteries $B_3$ and $B_5$.

Another circuit arrangement for the tube shown in Figs. 4 and 5 is illustrated in Fig. 8 in which the same designations are used on the electrodes. The battery for heating the cathode is left out in the diagram. The starting electrode 4 and the electrodes $5a$, $5b$, $5c$ et cetera are in this case subjected to different voltages so that the electrode voltages form a rising series of positive or negative voltages. Shifting of the current takes place by changing the potential level of the electron current in relation to the voltages in the electrode system by means schematically indicated by the displaceable contact of the battery $B_5$. Another possibility to change the potential level of the electron current is to change the electric or magnetic factors in the electron source which here consists of the cathode 1 and the anode 2, for instance, by changing the anode voltage $V_a$ or the magnetic field. The electron current goes essentially to that electrode the voltage of which agrees with the potential level of the electron current.

The electrodes placed along the path of the electron channel may be of different kinds having functions of a somewhat different character. In Fig. 9, $5a$, $5b$, $5c$ et cetera denotes electrodes, termed contact electrodes, the purpose of which is in the first line to receive the electron current and to utilize it in associated circuits, whereas the electrodes designated $6a$, $6b$, $6c$ et cetera are termed control electrodes which in the first line have for their purpose to influence the electron current, to conduct it and to change its course between different contact electrodes. If the control electrodes are so designed that they fall closer to the normal course of the electron channel than the contact electrodes, the position of the electron channel will be less depending or even independent of the voltages of the contact electrodes within wide limits. Said voltages may thus be selected comparatively freely and be adapted to suit the desiderata in those circuits $50a$, $50b$, $50c$ et cetera, which they are adapted to influence.

In the shown circuit arrangement the electron current will be directed to the contact electrode $5c$ by changing the voltage of the control electrode $6c$ to a value in the neighbourhood of the voltage of the auxiliary electrode 3. A potential barrier between said two electrodes then prevents the electron circuit to continue its earlier path. At the same time there arises an electric field between the control electrodes $6c$ and $6d$, the voltages of which now fall below or exceed the potential level of the electron current respectively which electric field conducts the current to the contact electrode $5c$.

The electron current may also be shifted according to the method described with reference to Fig. 8 if the control electrodes $6a$, $6b$, $6c$ et cetera in Fig. 9 are connected in the same manner as the electrodes $5a$, $5b$, $5c$ et cetera in Fig. 8.

The electrode system shown in Fig. 9 exemplifies at the same time the fact that the zero electrode may be left out. In such a case the electron current goes on the zero conditions to the electrode being next to the auxiliary electrode 3, in this case being the electrode $6a$.

In Figs. 10 and 11 there is shown a further kind of electrodes termed regulating electrodes. In contradistinction to control electrodes which are placed laterally of the path or paths along which the electron current is to be conducted the regulating electrodes are positioned across such a current path. If the regulating electrode is subjected to a voltage being in neighbourhood of the potential level of the electron current this current is let through but by imparting to the electrode a voltage different from said level, the path of the electron current may be blocked at this place. Figs. 10 and 11 show two main types of regulating electrodes. The one designated 10 consists principally of a grid of the type well known in the art of vacuum tubes. The other designated 11 consists of a couple of plates the one of which is placed in front of and the other behind the path of the electron channel, as counted in the direction of the magnetic field. By subjecting both plates in one couple of plates with the same or nearly the same voltage which considerably differs from that of the electron current there may be formed a blocking field which stops the electron current or reduces its amperage.

Regulating electrodes may also be positioned at the exit of the electron channel from the electron source, compare for instance the electrode 11 in Figs. 18 and 19 or as a grid surrounding the electron source, such as the electrode 12 in Fig. 16.

By combining contact electrodes, control electrodes and regulating electrodes in different manners there may be established a variety of different electrode systems suitable for different purposes. Some examples of such combinations are shown in Figs. 12 to 17. The method to direct the electron current in different ways is described with reference to said figures under the assumption that the circuit arrangement of the electrodes is in principal agreement with that shown in Fig. 6 but may also be made in other ways to be described later on.

Fig. 12 shows a tube having two groups of contact electrodes 5 and 51 respectively and control electrodes 6 and 61 respectively. The control electrodes 6 in the one group are held on their normal condition at a voltage exceeding the potential level of the electron current and the control electrodes 61 in the second group are held at a voltage falling below said level. The conducting of the electron current to the desired contact, such as the contact electrode $51a$ in the second group, may be performed by changing the voltage of the corresponding control electrode $61a$ to a value in the neighbourhood of the voltage of the control electrodes in the first group.

In Fig. 13 the electron current is influenced by four different series I to IV of control electrodes 6, 7, 8 and 9. The shifting of the electron current takes place in each series as a selection between two alternative paths as in an ordinary electromagnetic relay by imparting to a control electrode either the voltage of the anode 2 or that of the auxiliary electrode 3. The course of the electron channel as shown in the figure leading to the contact electrode $5a$ has thus been established by connecting the control electrodes 9 and $7a$ to the anode and the control electrodes $8a$ and $6a$ to the auxiliary electrode.

In Fig. 14 the contact electrodes 5 together with the appertaining control electrodes 6 are divided into groups. Each group has been equipped with a common group control electrode 7. The auxiliary electrode 3, on the one hand, and all the control electrodes 6 and 7, on the other, have in their normal condition voltages falling above and below the potential of the electron channel. The conducting of the electron current to a certain contact electrode, such as 5a, may be done by changing the voltage of the corresponding group control electrode 7a and the unity control electrode 6a belonging to the contact to a value in the neighbourhood of the voltage of the auxiliary electrode 3, the electron current being conducted to the desired compartment by means of potential barriers. Unity electrodes 6 having corresponding positions in the different groups form rows and may be mutually interconnected as is indicated in respect of the electrodes 6b to 6k.

The individual compartments in Fig. 12 may be replaced by entire groups of control electrodes and contact electrodes, and the compartments therein may in turn be subdivided by new control electrodes et cetera so that series of groups and sub-groups are obtained. An example of such a tube having several superior and subordinate series of control electrodes is illustrated in Fig. 15. It is not necessary to arrange the different series of control electrodes in perpendicular co-ordinates as the electron current by a suitable design of the electrodes may be brought to follow any geometrical configuration.

Fig. 16 is an example of a tube including regulating electrodes 10 in the front of the entrances to different electrode groups. If the regulating electrodes are subjected to a potential approaching that of the auxiliary electrodes the electron current may only be shifted between different group control electrodes 7. In this figure there is also shown a regulating electrode 12 surrounding the cathode 1 by means of which the potential level and amperage of the electron current may be influenced.

In Fig. 17 a tube is illustrated in which the same electron current energizes simultaneously two different contact electrodes belonging to different electrode systems. The first electrode system includes grid shaped contact electrodes 5 and intermediate control electrodes 6. The second electrode system includes plate shaped contact electrodes 51 and control electrodes 61. The electron channel passes an electrode 5 in the first system and gives off a part of its current thereto, whereupon it continues to an electrode 51 in the second system where the remaining current is absorbed. A change of the course of the electron channel may in the first system be performed by changing the voltage of all control electrodes to the left of the desired contact electrode to a value in the neighbourhood of the auxiliary electrode 3 and in the second system in the manner previously described.

In the cited examples it has been assumed that the magnetic field has been homogeneous. All the tubes may, however, also be made with inhomogeneous magnetic fields. This is exemplified in Figs. 18 and 19, showing a tube of the same type as that illustrated in Figs. 4 and 5 but placed in an inhomogeneous magnetic field. This field is produced in the shown embodiment by a permanent magnet 19 having a varying air gap but may, of course, also be generated by coils passed by current. In Figs. 18 and 19 there is further shown a regulating electrode 11, which by being subjected to different voltages may influence the amperage of the electron current. As long as the electric field between the electrodes 5a, 5b, 5c et cetera, on the one hand, and the electrode 3, on the other, is zero the circular paths of the electrons are displaced along a line corresponding to the magnetic field intensity H being constant, i. e. the electron channel is passing through a region having a definite magnetic field intensity. If the voltage of any one of the electrodes 5, such as 5c, is changed an electric field is established and the electron channel is dislocated. If the change in voltage is sufficient the electron current will be shifted entirely or partially from the zero electrode 4 to the electrode 5c or the electrode 5b in the same manner as is diagrammatically shown in Fig. 7. Any electric field between the electrodes 5a, 5b, 5c, et cetera and the electrode 3 is not necessary in an inhomogeneous magnetic field for the purpose of conducting the electron current forward but might very well be used. The electrode 3 may, if desired, be left out. However, as before, there should be an electric field between the cathode 1 and the anode 2.

Figs. 20 and 21 exemplify the deflection of the electron channel by means of local inhomogeneities in the magnetic field. Between the positive electrodes 5a, 5b, 5c et cetera, on the one hand, and the negative electrodes 51a, 51b, 51c et cetera, on the other, there is an electric field conducting the electron current from the cathode 1 to the zero electrode 4. Through local control coils 26a, 26b, 26c et cetera the main magnetic field may be amplified or weakened at desired places, the electron current being then deflected upwards or downwards in the figure. This has here been diagrammatically indicated so that the current in each couple of coils may be individually regulated to any arbitrary amperage and direction by means of the resistances $R_{26a}$, $R_{26b}$, $R_{26c}$ et cetera, but principally it is indifferent in which manner the excitation current is generated. If thus for instance the control coils 26c are passed by a current $i_{26c}$ of such a direction that the main magnetic field produced by the coils 25 is amplified the electron current will, upon rising values of the current $i_{26c}$, be transferred in the first line from the electrode 4 to the electrode 5c, and at still higher values of the current $i_{26c}$ be transferred further to the electrode 5d. Principally the process will be the same as that diagrammatically illustrated in Fig. 7 if the voltage $V_{5c}$ is exchanged against $$\frac{1}{i_{26c}}$$

If the current $i_{26c}$ has opposite direction so that it weakens the main field the electron current will instead pass to the electrode 51c or 51d.

In Figs. 20 and 21 there is shown at the same time a local excitation coil 28 by means of which the magnetic field in or adjacent to the electron source consisting of the cathode 1 and the anode 2 may be altered. Hereby the width and potential level of the electron current may be changed.

Fig. 22 illustrates an embodiment of the tube corresponding to that shown in Fig. 14 but with the difference that both series of control electrodes 6 and 7 are replaced by two series of control coils 26 and 27. The electron current is conducted to the desired contact electrode, such as 5a, by passing excitation current through the auxiliary coil 25a and one control coil in each series, in the shown example the control coils 26a and 27a. Combinations of control electrodes, regulating electrodes and control coils may be used to influence the electron current in the same tube.

In the above described types of tubes the path of the electron current is always perpendicular to the magnetic field. This is established by applying all electric deflecting forces perpendicularly to the field and by letting the electrons leave the electron source without having any major component of velocity in the direction of the magnetic field. The insignificant initial velocities in the latter direction, which may exist in the electrons, may be elminated in practice by letting the electron current be confined in the direction of the magnetic field by the wall of the electron tube or by shields built into the tube.

The electron tubes may also be so designed that the movement of the electron current in the direction of the magnetic field is utilized. A velocity in this direction is in that case imparted to the electrons in the electron source or by means of electric fields acting in the direction of the magnetic field. In a homogeneous magnetic field without disturbing forces each electron describes in such a case a screw-shaped path around a magnetic line of force. By influencing such an electron current by means of electrode systems similar to those above described the spiral path may be laterally displaced.

Fig. 23 illustrates an example of such a tube. From an electron source 21 there is emitted an electron current 22 which follows the lines of force in the magnetic field H generated by the coils 25. The velocity of the electrons in the direction of the magnetic field may, if desired, be accelerated by a field acting in this direction between the electrode 13 and the contact electrodes 5a, 5b, 5c et cetera. The electron current is passing through an electric field deviating from the direction of the magnetic field and formed between the electrode 3, on the one hand, and the electrodes 6a, 6b, 6c et cetera, on the other, and will then be laterally displaced. If any one of the control electrodes 6, such as 6b, obtains the same voltage as the electrode 3 the traversing electric field at this place will cease and the electron current will reassume its path parallel with the magnetic field in front of this electrode. During the lateral displacement the projection of the electron paths on a plane perpendicular to the magnetic field will be trochoidal. The lateral displacement can alternatively be produced by an inhomogeneity of the magnetic field with similar arrangements as above described. Several electrode systems may be superposed in the path of the electron channel. Combinations of this type of tube with the ones previously described may also be produced in which the electron current after having travelled a certain distance in the direction of the magnetic field is transferred into a system in which the path is perpendicular to the magnetic field.

Also in the above described systems in which the path of the electron channel is perpendicular to the magnetic field the electron current may be displaced at certain places in the direction of the magnetic field by means of electric fields directed in parallel with the magnetic field. The principle thereof is illustrated in Figs. 24, 25 and 26.

Figs. 24 and 25 show an embodiment in which a homogeneous magnetic field from the magnet 24 in combination with an electric field perpendicular thereto between the electrodes 3 and 31 conduct the electron current forward to the contact electrodes 5a and 5b. The tube includes further two electrodes 13 and 14 so disposed that a voltage applied therebetween produces an electric field parallel with the magnetic field. By varying this voltage the electron current may be shifted between the electrodes 5a and 5b or the distribution of the current on said electrodes be changed. The figure shows at the same time a regulating electrode 11 by means of which the amperage of the electron current may be altered.

In Fig. 26 there are used two corresponding electrodes 13 and 14 carrying different voltages in order to transfer the electron current between two electrode systems of above described type in each of which said current is moving at right angles to the magnetic field.

Finally the path of the electron current through the tube may be influenced by a mechanical change of the position of the tube in relation to the magnetic field or to electric fields generated by electrodes being outside the tube. Figs. 27 and 28 show an embodiment of such a tube placed in an inhomogeneous magnetic field. Upon a change of the position of the tube from that indicated by 20 to that indicated by 20' the path of the electron current will remain unchanged in relation to the magnetic field. The electrode 5b has, however, in the new position of the tube taken up the position in which the electrode 5a was previously so that the electron current is shifted from the electrode 5a to the electrode 5b.

In the above specification it has hitherto been assumed that the changes in the course of the electron current are utilized by bringing the electron current in contact with different electrodes provided in the electron tube. As an alternative, however, the changes in the course of the electron current as well as variations in its amperage (more closely elucidated below) may be recorded by capacitive means by electrodes which are not directly hit by the electron current or by induction current in conductors placed adjacent to the course of the electron current. Fig. 30 has for its object to illustrate these two possibilities in principle. By changing the voltage of the control electrode 6 which has been diagrammatically indicated by a variable battery voltage the distribution of the electron current between the electrodes 4a and 4b may be varied. In changing the amperage of the electron current flowing to the electrode 4a there is induced a current in the coil 30. The amperage of the induced current may be increased by lowering the progressive velocity of the electron current adjacent the coil, for instance, by changing the voltage of the electrode 3. A change of the electron current flowing to the electrode 4b results in a change in voltage of the electrode 5 in spite of the fact that the latter is not hit by the electron current. Thus contact electrodes as well as control electrodes and regulating electrodes may be situated alternatively inside or outside the wall of the evacuated vessel.

In the described embodiments the electron source has been shown as consisting of a hot cathode together with an accelerating anode. As an alternative, also other known devices to generate electron current may be used. In certain cases it may be found advantageous to use a so called electron gun, including means for accelerating and concentrating the electron to a more or less sharp ray and means for varying the amperage of the electron current. The strength of the magnetic field in or adjacent to the electron source may be made different from that of the other parts of the tube, for example by means of local coils (such as 28 in Fig. 21) or by magnetically shielding the electron source.

In most of the circuit diagrams above described the operation of the control means has been shown, for the sake of simplicity, as a static shifting between definite voltages. If the voltage of the control means is continuously variable it is, however, possible in all connections not only to shift the electron current in its entirety from one electrode to another but also to change the distribution of the electron current between different electrodes which are hit by the electron current simultaneously. The control voltage need not be static but may be a rapidly varying transient or periodical function.

It has above been described how the path of the electron current can be changed by changing the electric and/or magnetic field at suitable places of the tube. This path may also be changed in the shown embodiments by changing the conditions on which the electrons leave the electron source, i. e. their velocity and direction of movement and the intensity of the magnetic field at their exit from the electron source. The potential level of the electron current at its exit from the electron source may be calculated from said factors or be empirically determined.

The above described methods to change the position of the electron current by electron control means of different kinds may be utilized in different manners. The position of the electron current may be made visible, for instance, by letting the current act upon fluorescent screens, photographic plates or the like and thereby image or give information about the electrical quantities which have been supplied to the electron control means. The electron current may also actuate different electrodes or coils provided inside or outside the tube and therethrough cause changes in circuits associated therewith. On account of the variety of different manners in which the electron current may be governed and the adaptability of the current to be conducted in intricate paths there is considerable freedom in placing electrodes, coils or electro-optically sensitive screens in or on the tube so that the tube can be adapted to the technical desiderata presenting themselves in the different cases.

With reference to the above review of the different methods to change the path of the electron current it should be pointed out that it is possible to use electron currents from several different cathodes or electron sources within one and the same evacuated vessel and to conduct them to different electrodes belonging to the same electrode system without the currents disturbing one another. The different electron currents may be discriminated by causing the electrons to leave the electron sources at different potential levels. Fig. 29 is an example of such a valve having two cathodes $1a$ and $1b$. The cathode $1a$ is connected to the voltage 0 volt and the cathode $1b$ to the voltage $+100$ volts whereas the common anode 2 has the voltage $+200$ volts. The electron currents from the two cathodes hereby obtain different potential levels, say for instance, $+50$ volts and $+150$ volts respectively. A control electrode the voltage of which is rereduced from the starting value of $+200$ volts to $+100$ volts forms together with the auxiliary electrode 3 a potential barrier for the latter electron current but not for the former current. To deviate the former current the voltage of the control electrode must be lowered to the neighbourhood of the value 0 volt. In the diagram the control electrode $6d$ is shown as connected to a source of 100 volts and the control electrode $6b$ connected to a voltage of 0 volt, which results in the electron current from the electrode $1b$ being conducted to the contact electrode $5d$ and the electron current from the electrode $1a$ to the contact electrode $5b$.

In the above described embodiments the electron current is included as a conductor in the circuits to be influenced. If the electron currents here are to be used to transfer current variations, such as speech currents, the variations may be superposed thereon by variations of the voltage of a regulating electrode in the electron source or the neighbourhood thereof, such as the electrode $12$ in Fig. 16 or $11$ in Fig. 24. In such a case the variations may only be transferred in the one direction. In tubes of the type concerned in the present invention it is, however, also possible to establish communication by means of the electron current between several contact electrodes associated with different exterior circuits without the electron current itself being interlinked with said circuits.

Fig. 31 shows the principle of such a contact device comprising a couple of contact electrodes $a_1$ and $a_2$. The contact device is inserted between control electrodes $6a$ and $6b$, of which the electrode $6a$ is negative in relation to the electrode $6b$. The electron current is introduced by the control electrodes and hits the two contact electrodes $a_1$ and $a_2$. The distribution of current between the electrodes will be dependent on the mutual voltage relations of the contacts, as shown in Fig. 32, in which $V_1$ and $i_1$ are the voltage and current respectively of the contacts $a_1$, $i_1$ the current of $a_2$ and $i_{6b}$ the current through the control electrode $6b$. The curves refer to the voltage $V_2$ of the electrode $a_2$ being a constant, but similar relations are obtainable if $V_2$ is varied. If the neighbourhood of the point $V_1=V_2$ the contact $a_1$, $a_2$ will function as a galvanic connection having a certain contact resistance. The interior resistance between the contacts may be reduced by coating them with secondary emitting material. This resistance can be further reduced if the surfaces of the contacts are enlarged, for instance by forming them as laminae parcels, partially interposed into one another, compare Fig. 33.

Several contact couples or multielectrode sets may be arranged in a group which is simultaneously hit by the electron current and correspond then the $a$-, $b$- and $c$-contacts et cetera in automatic telephone selectors of mechanical type. If the contacts are then so positioned and directed that the individual couples or electrode sets fall in the plane of the trochoidal movement and the different couples or sets are superposed in parallel upon one another in the direction of the magnetic field and mutually screened, the advantage is gained that the transfer of the electrons from the one electrode to another is facilitated within the contact couples but is rendered difficult between electrodes belonging to different contact couples.

A few different embodiments of the contact couples are shown in Fig. 33. One couple of contacts $a_1$ and $a_2$ are composed by laminae parallel with the plane of the trochoidal movement. In the next contact couple there are two mutually parallel grids $b_1$ and $b_2$ perpendicular to the main direction of the electron current. Thereunder a third embodiment is shown which is composed by two grids $c_1$ and $c_3$ in front of a solid plate $c_2$. The different contact couples are separated by screens 29.

The contact couples consisting of, for instance, a grid and a plate as above described may be replaced by an electrode set, composed in the same manner as in an ordinary amplifying tube, the properties known from the different types of such tubes being obtained in combination with the properties specific for the trochoidal movement. The cathode of the ordinary amplifying tube is assumed to be replaced in the trochoidal tube by the cathode I together with the electron channel and the first contact grid in the electrode device which fact may be physically expressed by stating that a virtual cathode is formed immediately behind this grid. This occurs particularly if the next grid has a low voltage.

As an example the arrangement shown in Fig. 34 may be cited which consists of the following electrodes provided in a compartment viz. a contact grid $a_1$, a control grid $a_2$, a shield grid $a_3$, a suppressor grid $a_4$, and an anode $a_5$. This arrangement corresponds thus to a pentode. If the contact grid $a_1$ is strongly positive it allows as before the electron current to reach the next electrode, or if it is only faintly positive or negative, it rejects the current from the compartment. If the contact grid $a_1$ is positive and the control grid $a_2$ negative or faintly positive the variations in the control grid voltage govern the electrons arriving from the virtual cathode so that they return to and are caught by the contact grid $a_1$ or pass to the anode $a_5$ after having passed the shield and suppressor grids $a_3$ and $a_4$, which have the same function as in ordinary pentodes. If the amperage of the electron current to the compartment is governed in any one of the above mentioned ways a two-fold control may be obtained by the just mentioned electrode device, which results in the effect known from mixer tubes.

To obtain a better secondary emitting action and a better effect of extra grids, if any, it may be preferred to reduce the intensity of the magnetic field in the immediate vicinity of the contact groups. In such tube types in which the contact electrodes are provided along an outer edge of the selector as in the selector shown in Fig. 13 the desired result may be obtained by limiting the magnetic field so that its intensity is reduced at the contacts. In other cases where the contact electrodes also are provided in the interior of the electrode system such as in Figs. 14 and 15 the magnetic field may be altered by a magnetic shielding for instance by making the electrodes of ferro-magnetic material.

The influence of the exterior circuits upon the conditions when changing the course of the electron current will now be more closely treated. This change of the course of the current which has been described above is performed in such a manner that anyone or more of the described control devices are brought to influence the electron current through a change of the electric condition in the control device so that the position of the electron current is displaced. The impulse to the change in the control device may be supplied from the outside or be caused by the electron current itself. The change may remain during the whole time during which the electron current is to be held in its new position or the change may be of short duration and only be adapted to dislocate the electron current from its preceding position. In the latter case the receiver means actuated by the electron current in its new position may through special connecting element termed connection sets be associated with the control device in question or any other control device and actuates the control device in such a manner that the position of the electron current is maintained continuously or, as an alternative, is further dislocated. The operation of the connection set will be elucidated in the following text with reference to a number of different embodiments.

Fig. 35 shows the same electron tube as that illustrated in Fig. 6. Each one of the electrodes $5a$, $5b$, $5c$ et cetera, is associated with a battery through a connection set, in this case comprising an impedance $Z_a$, $Z_b$, $Z_c$ et cetera, the voltage of which battery is higher than the potential level $V_m$ of the electron current. Under the starting conditions the electron current is passing to the zero electrode $4$. If a negative voltage impulse is induced in a coil $35$ in series with the electrode $5c$ or if by the excitation of any other electron control device the course of the electron current is changed so that it hits the electrode in question the impedance $Z_c$ associated with the electrode is energized. This causes a voltage-drop in $Z_c$. If the impedance $Z_c$ is of a suitable magnitude the voltage of the electrode $5c$ is hereby lowered to the potential level $V_m$ of the electron current, which results in that the entire or most of the electron current $i_{5c}$ continues to flow to the electrode even after the control impulse has ceased. The negative voltage impulse need not be greater than that the voltage of the electrode $5c$ for a moment falls somewhat below the value $V_r$ in the diagram shown in Fig. 7. Below this value the condition is unstable, the voltage dropping to the neighbourhood of the value $V_m$ during a time which is determined by the time constant of the impedance $Z_c$.

For greater values of the impedance $Z_c$ the voltage of the electrode $5c$ will be lower than $V_m$. In such a case the current $i_{5c}$ will be reduced as shown in the diagram in Fig. 7. i. e. a part of the electron current will be deviated already before it has reached the electrode $5c$. In the tube as shown the current will be absorbed by the electrode $5d$. This electrode may in turn take over the electron current due to a drop of voltage in the impedance $Z_d$. The magnitude of the impedance $Z_d$ and the amperage of the electron current will determine whether the electron current will remain on the electrode $5d$ or be brought further. The electron current may in this manner be caused to travel from one electrode to another at a velocity determined by the time constants of the associated impedances.

Fig. 36 shows the electron tube according to Fig. 13 adapted to hold the electron current automatically in the above described manner. The individual series of control electrodes $6$, $7$, $8$ and $9$ are each interconnected and associated through connection sets consisting of resistances $Z_6$, $Z_7$, $Z_8$, and $Z_9$ with the anode $2$ having a voltage of $+200$ volts. The auxiliary electrode $3$ and the cathode I are held at zero voltage. The electron current is assumed to follow an equipotential level of $100$ volts.

The electron current flows then in its starting position between the electrode $3$, on the one hand, and the adjacent electrodes in the systems $9$, $8$, $7$ and $6$, on the other. Due to a reduction of short duration in the voltage of the electrode $9$ or due to the action of any other electron control device the electron current is brought into contact with the latter electrode for a moment and energizes the resistance $Z_9$. This causes a drop of voltage of the electrode 9 so far that the greater part of the electron current will now be passed on the opposite side of the electrode 9. This electrode will automatically absorb that fraction of the electron current which is necessary to maintain its low potential whereas the remainder of the electron current goes on further between the electrodes 9 and 8a. If the electron current for a moment is brought into contact with the control electrode 8a this electrode will in similar manner absorb a part of the electron current and through a voltage drop in the connection set $Z_8$ be adjusted to a suitable potential which causes the remainder of the electron current to pass further on between the electrodes 8a and 7a. If any impulse influencing the electron current is not supplied within the range controlled by the electrode system 7 so that the electron current never is brought into contact with the electrode 7a this electrode will maintain its high potential and the electron current will pass to the left thereof between the electrode 7a and the electrode 8a already adjusted to the lower potential. The electron current will thereupon be brought into contact with the control electrode 6a which absorbs further a part of the current and thereby obtain a low potential. The remainder of the electron current is finally passed on to the contact electrode 5a being in a compartment between the electrodes 6a and 7a.

The same type of connection may be used in a tube of the type shown in Fig. 14, if each group control electrode 7 and each horizontal row of unity control elements 6 are connected through separate impedances to the positive pole of the voltage source. A reduction of short duration of the voltage of a group control electrode, such as 7a, and a row of unity control electrodes, such as the row including the electrode 6a, brings the electron current to make contact with both of said control electrodes. A part of the electron current is then absorbed and causes a voltage drop in the impedances connected in series therewith so that the voltage drop is maintained. The remainder of the electron current is conducted in this way to the contact 5a positioned at the point of crossing.

If the potential level of the electron current is higher than the normal voltage of the electrode at which it is to be held the connection set must, when being energized, cause an increase in voltage. This can be established, by way of example, by using connection elements operating as relays or as a negative impedance. Figs. 37 and 38 illustrate two embodiments of such connection sets.

In Fig. 37 $Z_1$ and $Z_2$ are impedances, 40 a glow discharge lamp and 5 the electrode associated with the connection set. Upon an electron current to the electrode 5 the voltage drop across the impedance $Z_1$ is increased until the ignition voltage of the lamp is reached. When the lamp is ignited the voltage across the impedance $Z_1$ falls to the normal voltage of operation of the lamp which results in an increase of the potential of the electrode 5.

In Fig. 38 there are provided a potentiometer $Z_1$ and $Z_2$ and a vacuum pentode tube 41. If the amperage through the potentiometer $Z_2$ is increased due to current through the electrode 5 the suppressor grid voltage of the tube is increased which results in a decrease of the screen grid current which reduces the drop of voltage in the impedance $Z_1$ and hereby increased the voltage of the electrode 5.

In the above cited examples the connection set, upon being excited by the electron current, has influenced the position of the current path by changing the voltage of contact electrodes or control electrodes. The same result may be obtained by causing the connection set to change the voltage of regulating electrodes according to Figs. 11 and 16 or the current through excitation coils according to Fig. 21 or the potential level of the electron current by changing those factors which determine the velocity and direction of the electron current at its exit from the electron source or the intensity of the magnetic field at this place. In similar manner the current arriving at the connection set, instead of being derived from electrodes upon which the electron current is directly impinging, may be derived from a coil 30 or from an electrode 5 as shown in Fig. 30 which is energized by the electron current through induction.

The connection set may be built-up in different manners from known filter elements or electron discharge means. Their influence upon the control means may hereby be retarded or be made a variable function with the parameters time and amperage of the electron current.

The described properties of the connection set may be used to shift the electron current by successive impulses. Such a connection is shown in Fig. 39. The contact electrodes 5a, 5b, 5c et cetera are series-connected with connection sets 15a, 15b, 15c et cetera, and the control electrodes, 6b, 6c, 6d et cetera are series-connected with connection sets 16b, 16c, 16d et cetera. The connection sets of the contact electrodes and those of the control electrodes may have different properties. The auxiliary electrode 3 has a voltage which falls below the potential level of the electron current, and the contact electrodes and the control electrodes have a voltage which exceeds said level with the exception of that compartment in which the electron current is passing for the time being. In this compartment a part of the electron current is absorbed by the one control electrode 6c in Fig. 39 and flows as regards its main part to the contact electrode 5c. The voltages of the electrodes 6c and 5c have been lowered by the connection sets 16c and 15c associated therewith. A negative voltage impulse supplied via the coil 35 causes a reduction of short duration of the voltage of the electrode 5c. The base line of the electron current passes then momentarily through the air gap between the electrodes 5c and 6d. If the air gap therebetween is less than the diameter of the circular paths of the electrons some of the electrons will impinge upon the electrode 6d, so that current is flowing through the connection set 16d associated with the electrode. Hereby the voltage of the electrode 6d is lowered which results in that, after the lapse of a certain time, the delay time, determined by the connection set and the amperage of the current, the equipotential line is transferred to the opposite side of the electrode and passes between the electrodes 6d and 5d. The electron current hits now both of said electrodes. It remains in this position the main portion of the current being absorbed by the electrode 5d whereas the electrode 6d absorbs so much current that it is required to hold the electron current in this compartment. A new impulse from the coil 35 transfers in the same way the electron current to the next compartment.

It has been presupposed above that the distance between the contact electrodes and the control electrodes should be less than the diameter of the circular movement of the electrons in order to enable the shifting of the electron current from the one electrode to the other. Such a shifting may take place even if the distance is greater than said value. In this case the tube wall behind the interspace between the electrodes or plates or shields provided at that place is charged by the electron current.

In the example cited the impulses are introduced upon an interconnected system of contact electrodes, whereby only the electrode positioned at the actual position of the electron current is influencing the same. In case the compartments between the different control electrodes include several contact electrodes, such as the contact group shown in Fig. 33, it is sufficient if the impulse is supplied to one of the electrodes included in the contact group. This electrode transfers then a part of the electron current to the next control electrode which is electrically unstable and thereby automatically takes over and forwards the electron current. If speech currents are to be transmitted via the contact electrodes it may, however, be found inconvenient to use said electrodes for the impulsing. This can then be carried out otherwise, for instance, through impulsing upon the control electrodes by means of the coil 36.

Principally, the invention may be adapted for shifting the electron current by impulses supplied to any one of the electron control means referred to above. The connection set affords in addition a further possibility of shifting, i. e. a change of the amperage of the electron current. A change of the amperage through the connection set may, as above pointed out, result in that the course of the electron current becomes unstable so that it travels further to the next electrode. A change in the amperage of the electron current may be caused by means of a grid or a regulating electrode in the electron source or in the neighbourhood thereof, such as the electrode 10 in Fig. 39.

In the art of the automatic telephony it is customary to perform the impulsing in the form of impulse groups corresponding to the different digits in a number having several digits. In electron tubes according to the present invention the different impulse groups may be brought to influence the electron current in different manners. In the tube shown in Fig. 14 said influence may be caused, by way of example, by associating each group control electrode 7 and each horizontal row of unity control electrodes 6 with a connection set, the connection sets of the group control electrodes and of the unity control electrodes being designed with different time constants. The impulsing via the group electrodes may then be performed with impulses having prolonged duration or enlarged amplitude, so that all the unity electrodes in one group together with the next group control electrodes are passed for each impulse. The impulsing via the unity control electrodes is performed with short or small impulses which each only dislocate the electron current a step corresponding to one compartment.

In the tube shown in Fig. 16 the impulse groups may be separated by letting the path of the electron current to all of the electrodes between two group control electrodes 7 be blocked by regulating electrodes 10 which during the first impulse series carry such a voltage that the electron current is passing each group as a unity. The connection of the regulating electrodes is changed before the arrival of the second impulse group so that the electron current then by each impulse is transferred only fom one contact electrode 5 to the next one. The same result may be obtained if the electron current during the first impulse series is made unstable as regards all electrodes falling between two consecutive group control electrodes 7 which may be caused by a change of the potential to which the connection sets of said electrodes are connected or through a change of the potential level of the electron current or the amperage thereof as previously described.

The electron tube shown in Fig. 39 may also be adapted to operate as a finder in an automatic telephone system. The connection sets should in such a case be so designed that the electron current becomes unstable and, as above described, automatically travels from one electrode to another at a speed which is determined by the delay time of the connection sets. The current may be brought to stop at any desired electrode by impressing on the latter a potential different from those of the other electrodes or by reducing or suppressing the action of the connection set of the electrode, for instance, by short-circuiting the connection set. If no electrode is call-marked in this manner the electron current travels further to the last control electrode 6f and is by said electrode forwarded to the acceleration anode 2 which receives its potential through a connection set 32. Upon being energized this connection set causes a reduction of short duration of the anode voltage. Hereby the amperage of the electron current emitted from the cathode will be reduced momentarily. When the current begins to rise anew the control electrode 6f has already re-assumed its normal voltage so that the electron current is now conducted to the farthest electrode 5a and continues to travel around. When using this type of circuit arrangement the present invention may be used as a cyclically operating switch or distributor.

In certain of its embodiments the invention may be applied to selectors or finders in automatic telephone systems. The contact group corresponding to each position of the electron current includes then two contact couples, compare Figs. 31 and 33, for the transfer of speech. Calls and busy-marking and call-metering and other manipulations may be carried out according to the same grounds as in mechanical selectors via a third contact couple in the contact group. Further contact couples may be provided, if necessary. The energization of the desired contact group takes place by means of the electron current which is transferred by means of impulses or by a searching movement as described with reference to Fig. 39 or by a direct setting, compare Fig. 14. Due to the fact that the electrode system may be arranged as a "honey-comb" which not necessarily must be plane, several selectors may be placed in a simple manner on parallel levels as shown in Fig. 40 which will be more closely described below. This is of advantage as regards design and interconnections because homologous contact groups in a plurality of selectors, which generally should be associated to form a multiple. Of greater importance is, however, that if a plurality of such selectors having a common multiple are to be enclosed in the same evacuated vessel, the number of leads passing through the vessel wall is reduced to a fraction of the number otherwise necessary.

Another form for call- and busy-marking in a number of finders and selectors having a common multiple is shown diagrammatically in Fig. 40. In this figure A and B designate finders and F and G selectors. Each subscriber $a_1$, $a_2$, $a_3$ et cetera is through a connection set consisting of an impedance $Z_5$ connected to a contact group in each finder and selector. The contact couples included in the contact group have the one contact electrode $c_1$ connected with the common line of the finder or selector and the other contact electrode $c_2$ with the subscriber. For the sake of clearness there is shown only one contact couple in each contact group in the figure. The contact electrodes for idle subscribers are connected to the voltage +100 volts via the impedance $Z_5$. In the finders group control electrodes and horizontal rows of unity control electrodes are connected via impedances $Z_7$ and $Z_6$ to such a voltage that in idle finders the electron current having a potential level of $P=+150$ volts, will travel from one electrode to another round the finder in the manner above described. The contact electrodes of the idle subscribers which have a lower voltage, say 100 volts than the potential level of the electron current are unable to hold this current. In the selectors the electron current may be conducted to the desired position by changing the voltage of a group control electrode and a horizontal row of unity control electrodes as above described. The electron current in the idle selectors has the potential level $P=+100$ volts and may thus remain on the contact electrodes of the idle subscribers.

Upon a call from any subscriber, such as $a_3$, the voltage of the subscriber's contacts electrode $c_2$ is raised to +150 volts. When the electron current in a finder hits an electrode, marked in this way, it stops. The finder is thereupon shifted by means of equipment belonging thereto but not shown in the figure to the potential level $P=+50$ volts. Through a drop of voltage in the impedance $Z_5$ of the subscriber the voltage of the subscriber's contact electrodes $c_2$ is reduced, both as regards this finder and other finders and selectors, to +50 volts which involves that the subscriber is busy-marked. In the figure the finder B has been shown as connected-up in this manner to the subscriber $a_{12}$. The electron current in the selector brought to this position has a potential level $P=+100$ volts and may not remain on the electrode $c_2$ but is shifted to an adjacent electrode $c_3$ in the same contact group, compare Fig. 33, in which a busy-signal may be issued. In the case where the subscriber has several lines under a common group number, the electrode $c_3$ may be negative, whereby the electron current is transferred to the following compartment.

If on the other hand the electron current of the selector is directed to an idle subscriber's contact group the electron current remains on the electrode $c_2$. As in the case of the finder there is caused a change of the potential level of the selector to $P=+50$ volts and the voltage of the subscriber's contact electrodes $c_2$ in all finders and selectors is reduced to +50 volts. Hereby said electrodes will be inaccessible for idle finders and selectors which all have a too high potential level. The selector G has in the figure been shown as connected in this manner to the subscriber $a_{14}$, which thus is busy-marked in the remaining selectors.

The cited circuit arrangement is an application of the general principle according to which a number of electron tubes of the type of the present invention may have common or electrically interconnected electrodes, whereas the electron currents are conducted individually through the use of different potential levels.

Fig. 41 shows the utilization of the electron discharge device above described operating as a cyclic switch for multiple telephony. Each contact group consists of two electrodes of which the one $5b$ communicates with the common line 37. The speech current incoming from different telephone channels 50 are supplied to the contact electrodes $5a$. The electron current is shifted from compartment to compartment by means of short voltage impulses supplied via the coil 36. Such an impulse reduces the voltage of the contact electrode on which the electron current remains so that the current is transferred to the control electrode 6 being next on the right hand side thereof. Through a change of voltage in the corresponding connection set 16 the control electrode shifts automatically the electron current to next contact group in which it remains until the next voltage impulse occurs. When the electron current has reached the last control electrode it is restored in the same manner as is described with reference to Fig. 39 to its farthest position. The same electron discharge device may be used at the receiver end of the common line for the distribution of the current variations on different telephone lines. If two couples of contact electrodes are enclosed in each compartment both branches of the telephone lines may be switched simultaneously and the device may be balanced.

In multiple telephony it is advantageous under certain conditions to use pulse-time-modulation on the common transmission line. Several arrangements are known for converting amplitude- or frequency-modulated signals in the different incoming telephone channels to pulse-time-modulated signals in the transfer connection. The invention is easily adaptable to this purpose which may be combined with the function as a cyclic switch. An embodiment of the invention for such a purpose is shown diagrammatically in Figs. 42 and 43, of which Fig. 42 constitutes the sender and Fig. 43 the receiver.

In Fig. 42 control electrodes $6b$, $6c$, $6d$ et cetera are connected through connection sets $16b$, $16c$, $16d$ et cetera to a source of voltage. Said connection sets are further connected to one of the branches in the common transmission line 37. The contact electrodes $5a$, $5b$, $5c$ et cetera are all connected to the voltage source via the connection sets $15a$, $15b$, $15c$ et cetera and a winding in the transformers $50a$, $50b$, $50c$ et cetera of the incoming telephone channels. The momentary voltage of each contact electrode will thus vary in agreement with the amplitude modulated current in the corresponding telephone channel.

If the electron current hits one of the control electrodes, such as $6b$, current will flow through the connection set $16b$, the result being, on the one hand, that a voltage impulse is supplied to the line 37 via the outlet from this connection set and, on the other, that the voltage of the electrode $6b$ rapidly decreases. After a moment this voltage has become so low that the base line of the electron current is shifted to the gap between the electrode $6b$ and the next electrode $5b$. A part of the electron current flows now to the electrode $5b$ and through the connection set $15b$ in which it causes an increasing drop of voltage. The voltage of the electrode $5b$ begins to sink at a velocity which is determined by the electrical properties of the connection set $15b$. When the voltage has been reduced to the potential level of the electron current the base line of said current will move to the opposite side of the electrode 5b. The electron current will then make contact with the control electrode 6c and be rapidly taken over thereby. At the same time there is issued an impulse through line 37 from the connection set 16c of the control electrode. The time interval between this voltage impulse and the preceding one is determined by the time required for the voltage of the electrode 5b to sink down to the potential level of the electron current. This time depends in turn on the voltage at which the reduction of voltage has started, i. e. the momentary voltage which is supplied through the transformer 50b, it being understood that this voltage may be considered as constant during the short time interval between two impulses.

The electron current in this way travels from one electrode to another. At each control electrode there is issued an impulse through the line and the interval of time between the impulse is determined by the momentary voltages supplied to the contact electrodes from the telephone channels. After the electron current has passed the last control electrode 6f it is restored by means of a connection element 32 series-connected with the anode 2 to the first contact electrode 5a in the manner described with reference to Fig. 39. Alternatively 32 may be a synchronizing device restoring the electron current periodically and at the same time transmitting a synchronizing impulse. The impulses outgoing through the line may have any arbitrary wave form by correspondingly designing the contact sets of the control electrodes according to principles well known in the art of filters. The connection set 16f associated with the last control electrode 6f may be designed in a manner different from that of the remaining ones so that the impulse issued therefrom through the line will have a character different from that of the other impulses and may serve as a synchronizing impulse. The impulses may, for instance, have the appearance as shown in Fig. 44 in which 39b, 39c, 39d, 39e and 39f designate impulses from the control electrodes 6b, 6c, 6d, 6e and 6f.

On the receiver side according to Fig. 43 the incoming impulses are conducted to the interconnected contact electrodes 5a, 5b, 5c et cetera. The control electrodes 6a, 6b, 6c et cetera are connected via connection sets 16a, 16b, 16c et cetera to the outgoing telephone channels, the connection sets being so designed that the position of the electron current on the control electrodes becomes unstable. In the time interval between two impulses the base line of the electron current will pass between a control electrode and the next contact electrode, such as between electrodes 6b and 5b, and the current will be divided between said two electrodes. An incoming impulse reduces the voltage of the electrodes 5b which then brings the electron current into contact with the control electrode 6c. This shifts in turn the current immediately to its opposite side where it is divided between the electrodes 6c and 5c. After a short moment the current through electrode 6c has reached a constant value and flows then to the associated telephone channel during a period of time which is determined by the time interval to the next impulse. The quantity of electricity which is supplied to each telephone channel while the electron current remains on the corresponding contact electrode will thus be proportional to the interval between the impulses. If the synchronizing impulse is used this is received by the filter set 38 in which it causes a momentary reduction of the anode voltage which restores the electron current to the electrode 6a. If no synchronizing impulse is used the electron current may be restored by means of the same arrangement as in the sender.

The arrangement described in Figs. 42 and 43 operates at the same time as a switch and a modulation-converter. In comparison with switches rotating at a constant speed the invention has the further advantage that it adapts its velocity to the duration of the signals so that the entire cycle thereof may be utilized for an efficient signal transfer.

The impulse-driven arrangements according to certain of the embodiments are not restricted to the above described fields of application but may be utilized also for other purposes. They may thus, inter alia, but used as counting device or meters for repeated phenomenae, for instance in connection with a Geiger-Müller counter. By way of example, the electron tube shown in Fig. 39 is suitable for this purpose. In that case the impulses to be counted may be introduced through a coil 35. From the tube there is tapped off one impulse for each cycle, for instance, in relation to the reduction of the anode voltage which restores the electron current to its starting position. These impulses may then in turn be counted by another electron tube or a mechanical meter.

It has above been pointed out that the electron current may not only be shifted between different electrodes but its distribution on several electrodes simultaneously hit thereby may be varied. The invention may thus be used as an amplifier, the voltage or current which is to be amplified being supplied to the electron control device. The invention may also be used as an oscillator either by arranging a feed-back coupling of one or more of the electrodes influenced by the electron current to the electron control device or by utilizing the above described dynatron-characteristic, compare Fig. 7. Figs. 45 and 46 exemplify diagrammatically these two main types.

Fig. 45 shows the electron tube illustrated in Figs. 24 and 25 but connected as an oscillator. The electron control device consisting of the electrodes 13 and 14 is associated with an oscillatory circuit composed by coils $L_{12}$ and $L_{13}$ and the condenser $C_1$. A variation in the voltage between 13 and 14 causes a variation in the change of the distribution of the electron current on the electrodes 5a and 5b, so that an amplified effect is obtained in the coils $L_{5a}$ and $L_{5b}$. Said coils are coupled back to coils $L_{12}$ and $L_{13}$. The output is tapped off through coil $L_2$.

In Fig. 46 the control electrode 6 is connected to the voltage source through an oscillatory circuit $L_6$, $C_6$. If the direct current voltage of the electrode falls within the region of the dynatron characteristic, i. e. the curve $V_{5c}$ between positions $V_m$ and $V_r$ in Fig. 7, the electrode 6 will start self-oscillations and shifts the electron current alternately between the electrodes 5a and 5b. The output is tapped off through coil $L_2$.

Through the several electron control devices provided in an electron tube according to the present invention it is possible to superpose on the electron current, variations emanating from several different sources. The invention may hereby be applied as a mixer tube. Principally then all above described electron control devices may be used. Fig. 47 shows an embodiment in which the oscillations are introduced in two control electrodes 6a and 6b. The main frequency is generated in the oscillatory circuit L6a, C6a and the modulation frequency is supplied through the device 33. The modulated output is taken from coil L2.

Fig. 48 shows one of the embodiments of the invention in which the changes in the position of the electron current are indicated on a fluorescent screen or photographic film 41. The electron current is generated by an electron source 21, which may be designed as an electron gun. The progressive velocity of the electron current is established by a voltage difference between the electrodes 3 and 6 maintained by a battery B2. Between the screen 41 and the grid 42 in front thereof there is a voltage difference maintained through tappings from the battery B1. This voltage difference accelerates the electrons adjacent the screen and increases thereby the effect of the impinging electrons. This grid, however, may be omitted. The electric voltage quantities to be indicated on the screen are introduced through the devices 43 and 44. The former thereof dislocates the electron current vertically whereas the latter device deflects the current laterally.

As is understood by the preceding specification the present invention consists of a considerable number of mutually independent elements which may be individually varied, for which reason the number of possible combinations falling within the scope of the invention is so large that it is practically impossible to describe and illustrate them all in this application.

This application is a division of our copending application Serial No. 651,920, filed March 4, 1946 and issued June 27, 1950 as Patent No. 2,513,260.

We claim:

1. In an electric circuit, in combination, an electron-emitting source which generates an electron current, a magnetic field causing the electrons of the current to move in curved paths, the projections of which are similar in a plane perpendicular to the magnetic field, electron-advancing means to impart to the electrons, outside the electron source, a progressive movement superposed on said circular movement whereby they move in trochoidal paths to form a beam, a group of electron control devices each arranged to cause a displacement of the path of the center of the circular movement in such a way that the radius of curvature of the projection of the last mentioned path is altered in a plane perpendicular to the magnetic field, a group of electrode devices, one for each control device, to receive the electron current, means to apply a potential to each device of each group, a connection element in the circuit between the potential applying means and each of the devices of one of said groups, said connection elements being constructed and arranged to activate a control device upon a change in the electron discharge on an electrode device.

2. In an electric circuit, in combination, an electron-emitting source which generates an electron current, a magnetic field causing the electrons of the current to move in curved paths, the projections of which are circular in a plane perpendicular to the magnetic field, electron-advancing means to impart to the electrons, outside the electron source, a progressive movement superposed on said circular movement whereby they move in trochoidal paths to form a beam, a group of electron control devices each arranged to cause a displacement of the path of the center of the circular movement in such a way that the radius of curvature of the projection of the last mentioned path is altered in a plane perpendicular to the magnetic field, a group of electrode devices, one for each control device, to receive the electron current, means to apply a potential to each device of each group, a connection element in the circuit between the potential applying means and each of the devices of each of said groups, said connection elements being constructed and arranged to change the potential on one of said devices upon a change in the electron discharge on an electrode device so that the electron current may be shifted to a new position.

3. A circuit as claimed in claim 2 in which the connection elements comprise impedances which upon a change in current flow of the electron current therein cause a change in the voltage on the connected device.

4. The circuit defined in claim 1 in which means is provided in a conductor common to all of the devices in a group for receiving and transmitting an initiating impulse to the devices to start the transfer of the electron current from one device to an adjacent device.

5. In an electric circuit, in combination, an electron-emitting source which generates an electron current, a magnetic field causing the electrons of the current to move in curved paths, the projections of which are circular in a plane perpendicular to the magnetic field, electron-advancing means to impart to the electrons, outside the electron source, a progressive movement superposed on said circular movement whereby they move in trochoidal paths to form a beam, a group of electron control devices each arranged to cause a displacement of the path of the center of the circular movement in such a way that the radius of curvature of the projection of the last mentioned path is altered in a plane perpendicular to the magnetic field, a group of electrode devices, one for each control device, to receive the electron current, means to apply a potential to each device of each group, a connection element in the circuit between one of the potential applying means and each of the devices of each of said groups, said connection element being constructed and arranged each to provide a negative resistance characteristic so that passage of the electron current therethrough causes a rise in the voltage of the connected device.

6. In an electric circuit, in combination, an electron-emitting source which generates an electron current, a magnetic field causing the electrons of the current to move in paths, the projections of which are circular in a plane perpendicular to the magnetic field, electron-advancing means to impart outside the electron source, a progressive movement superposed on said circular movement whereby the electrons move in trochoidal paths to form a beam, a group of electron control devices each arranged to cause a displacement of the path of the center of the circular movement in such a way that the radius of curvature of the projection of the last mentioned path is altered in a plane perpendicular to the magnetic field, a group of electrode devices, one for each control device, to receive the electron current, means to apply a potential to each device in each group, a connection element in the circuit between the potential applying means and each of the devices of one of said groups, said connection elements being constructed and arranged to have successively different time constants, means in a conductor common to all of the devices in one group to transmit voltage impulses thereto, and means to adjust the duration of impulse to the time constant of a selected connection set to activate a device associated therewith.

7. In an electric circuit, in combination, means to generate an electron current, a magnetic field arranged to cause the current electrons to move in paths, the projections of which are circular in a plane perpendicular to the magnetic field, electron-advancing means to impart a progressive movement superposed on said circular movement whereby the electrons move in trochoidal paths to form a beam, a group of electron control devices each arranged to cause a displacement of the path of the center of the circular movement in such a way that the radius of curvature of the projection of the last mentioned path is altered in a plane perpendicular to the magnetic field, a group of electrode devices one for each control device to selectively receive the electron current, means to apply a potential to each device, a connection element for each device in the circuit between the potential applying means and each said connection element being constructed and arranged to regulate the current flow of each activated device so as to cause the beam to travel from one electrode device to the next in succession continuously.

8. In an electric circuit, in combination, means to generate an electron current, a magnetic field arranged to cause the current electrons to move in paths, the projections of which are circular in a plane perpendicular to the magnetic field, electron-advancing means to impart a progressive movement superposed on said circular movement whereby the electrons move in trochoidal paths to form a beam, a group of electron control devices each arranged to cause a displacement of the path of the center of the circular movement in such a way that the radius of curvature of the projection of the last mentioned path is altered in a plane perpendicular to the magnetic field, a group of electrode devices one for each control device to selectively receive the electron current, means to apply a potential to each device, a connection element for each device in the circuit between the potential applying means and each device, means to apply a voice signal to all of the electrode devices, an output signal line connected to all of the control devices and to said electron generating means, and means to adjust the potential on various of the devices to selectively cause the beam to simultaneously contact an electrode device and a related control device to form a connection therebetween.

9. In an electric circuit, in combination, means to generate an electron current, a magnetic field arranged to cause the current electrons to move in paths, the projections of which are circular in a plane perpendicular to the magnetic field, electron-advancing means to impart a progressive movement superposed on said circular movement whereby the electrons move in trochoidal paths to form a beam, a group of electron control devices each arranged to cause a displacement of the path of the center of the circular movement in such a way that the radius of curvature of the projection of the last mentioned path is altered in a plane perpendicular to the magnetic field, a group of electrode devices one for each control device to selectively receive the electron current, means to apply a potential to each device, a connection element for each device in the circuit between the potential applying means and each device, means to apply a succession of voltage impulses to the system to effect a change in the electrode receiving the beam and means to adjust the initial velocity of the electrons at the source between impulses to determine the destination of the beam.

10. In an electric circuit, in combination, means to generate electron currents, a magnetic field causing the electrons of the currents to move in paths, the projections of which are circular in a plane perpendicular to the magnetic field, electron-advancing means to impart to the electrons, outside the electron sources, a progressive movement superposed on said circular movement whereby they move in trochoidal paths to form separate beams, a plurality of groups of interconnected electron control devices each arranged to cause a displacement of the path of the center of the circular movement in such a way that the radius of curvature of the projection of either of the last mentioned paths is altered in a plane perpendicular to the magnetic field, a plurality of groups of interconnected electrode devices, one for each control device, to receive the electron currents, means to apply a potential to each device of each group, a connection element in the circuit between the potential applying means and each of the devices of said groups, means to direct the current from one of said sources to a selected one of said electrodes, means to then change the character of the current from said source whereby the connection set associated with said selected electrode changes the potential thereon and on the interconnected devices so that the first current remains on the selected electrode and the remaining currents are excluded from those connected thereto.

11. The circuit as defined in claim 10 in which the character change of the first current comprises a change in its amperage.

12. The circuit as defined in claim 10 in which the several groups of electrode devices and their control devices are arranged in spaced parallel layers and in which the different electron currents move each only in one of said layers.

HANNES ALFVEN.
HARALD ROMANUS.

REFERENCES CITED

The following references are of record in the file of this patent:

UNITED STATES PATENTS

| Number | Name | Date |
|---|---|---|
| 2,205,071 | Skellett | June 18, 1940 |
| 2,233,779 | Fritz | Mar. 4, 1941 |
| 2,293,567 | Skellett | Aug. 18, 1942 |
| 2,372,210 | Labin | Mar. 27, 1945 |
| 2,372,328 | Labin | Mar. 27, 1945 |
| 2,395,299 | Skellett | Feb. 19, 1946 |
| 2,446,228 | Hillier | Aug. 3, 1948 |